United States Patent
Nasserbakht et al.

(10) Patent No.: US 6,279,077 B1
(45) Date of Patent: Aug. 21, 2001

(54) BUS INTERFACE BUFFER CONTROL IN A MICROPROCESSOR

(75) Inventors: Mitra Nasserbakht, Dallas; Patrick W. Bosshart, Plano, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/821,874

(22) Filed: Mar. 21, 1997

Related U.S. Application Data
(60) Provisional application No. 60/014,114, filed on Mar. 22, 1996.

(51) Int. Cl.$^7$ .................................................. G06F 12/08
(52) U.S. Cl. ............................... 711/118; 710/57; 710/52; 711/146; 711/122
(58) Field of Search .................................. 711/122, 146, 711/133, 159, 172, 171, 118, 112, 113, 164; 710/52, 56, 57

(56) References Cited

U.S. PATENT DOCUMENTS

| | | | | |
|---|---|---|---|---|
| 5,023,776 | * | 6/1991 | Gregor ................................. | 711/122 |
| 5,043,883 | * | 8/1991 | Inouchi et al. ...................... | 711/169 |
| 5,440,757 | * | 8/1995 | Yoshida ............................... | 712/228 |
| 5,479,641 | * | 12/1995 | Nadir et al. ......................... | 711/128 |
| 5,548,766 | * | 8/1996 | Kaneko et al. ...................... | 710/127 |
| 5,561,823 | * | 10/1996 | Anderson ............................. | 710/52 |
| 5,630,075 | * | 5/1997 | Joshi et al. .......................... | 711/100 |
| 5,659,713 | * | 8/1997 | Goodwin et al. .................... | 711/157 |
| 5,680,571 | * | 10/1997 | Bauman ............................... | 711/122 |
| 5,713,006 | * | 1/1998 | Shigeeda .............................. | 711/170 |
| 5,737,563 | * | 4/1998 | Shigeeda .............................. | 711/5 |
| 5,737,744 | * | 4/1998 | Callison et al. ..................... | 711/114 |
| 5,737,748 | * | 4/1998 | Shigeeda .............................. | 711/122 |
| 5,740,398 | * | 4/1998 | Quattromani et al. .............. | 711/117 |
| 5,784,698 | * | 7/1998 | Brady et al. ......................... | 711/171 |
| 5,798,843 | * | 8/1998 | Yamamoto et al. ................. | 358/404 |
| 5,809,546 | * | 9/1998 | Greenstein et al. ................. | 711/164 |
| 5,890,003 | * | 3/1999 | Cutts, Jr. et al. .................... | 710/263 |

\* cited by examiner

Primary Examiner—Matthew Kim
Assistant Examiner—Pierre-Michel Bataille
(74) Attorney, Agent, or Firm—Robert D. Marshall, Jr.; W. James Brady, III; Frederick J. Telecky, Jr.

(57) ABSTRACT

A microprocessor (5) including a plurality of write buffers (30) of varying sizes is disclosed. The varying sizes of the write buffers (30) allow for each write transaction from the core of the microprocessor (5) to be assigned to the most efficient write buffer size. Each write buffer (30) also includes sequential control logic (50) that issues a status code indicating the extent to which its write buffer (30) is filled; the control logic (50) advances to a more full state responsive to receiving a new data transaction from the internal bus, and advances to a more empty state responsive to completing a write transaction to the external bus. Each write buffer (30) communicates data from an internal bus (PBUS) to an external bus (BBUS) in a manner that is synchronized in the control path, rather than in the data path. Clock domain translation circuitry (65) is included within timing control circuitry (62) to translate the control signal from one clock domain to another, thus ensuring that overlapping writes do not occur. Internal snoop control circuitry (71) is also provided, for controlling access to the write buffers (30) so that memory reads missing in on-chip cache may be performed to the write buffers (30), rather than to main memory (21), if the data remains resident therein. A read buffer (33) is also disclosed, and has a plurality of entries for receiving blocks of data from the external bus (BBUS); upon receipt of a block of data, the read buffer (33) indicates the presence of data therein to the core of the microprocessor (5) to initiate its retrieval for execution of an instruction.

12 Claims, 8 Drawing Sheets

L = LINEUP
R = REGION

BUS INTERFACE BUFFER CONTROL IN A MICROPROCESSOR

This application claims priority under 35 USC 119(e)(1) of the provisional application No. 60/014,114, filed May 22, 1996.

This invention is in the field of integrated electronic circuits, and is more specifically directed to the control of the operation of integrated circuits of the microprocessor type.

BACKGROUND OF THE INVENTION

Many modern data processing systems are of the microprocessor-based type, in that the central processing unit (CPU) of the system is a single-chip microprocessor. Particularly with constant increases in the density of active elements within a single integrated circuit, modern microprocessors are synchronous devices operating at very fast clock rates, exceeding 150 MHz. As is known in the art, many other integrated circuits and subsystems in the microprocessor-based digital system cannot operate at the same high speed as the microprocessor. In addition, conventional systems typically communicate digital signals among its circuits and subsystems by way of buses (i.e., groups of parallel conductors) synchronously with a clock signal that is often several times slower than the high speed clock operating the core of the microprocessor CPU.

System performance has been increased in recent years by the increasing use of cache memories that are placed on-chip with the microprocessor, allowing a large fraction of the memory accesses that are performed in the execution of a computer program to take place at the high clock speed available internally within the microprocessor. Of course, the size of on-chip cache memory cannot approach the total system need for random-access memory, requiring system main memory to reside off-chip, typically in slow (relative to the CPU core clock) dynamic random access memory (DRAM). The microprocessor CPU must thus have functionality for performing memory accesses to main memory via a bus.

In addition to on-chip cache memory, one or more units of on-chip memory elements are functionally located between off-chip main memory and the on-chip caches. The function of these memory units is to buffer, or hold, incoming and outgoing information to allow the microprocessor to continue processing during the servicing of a read or write request on the external bus. A write buffer is typically a buffer contained within the bus interface unit (BIU) of the microprocessor, to which data is written from an internal bus within the microprocessor synchronously with the high-speed internal core clock. The write buffer stores this data (along with a tag corresponding to the destination memory address) and presents it to the external bus of the system synchronously with the slower bus clock when the bus and main memory become available; write buffers are also typically used in connection with memory-mapped output functions. Depending, of course, upon the quantity of data being written to main memory, the use of write buffers can greatly improve microprocessor performance. For example, the core of the microprocessor can rapidly write the results of its operations to the write buffer and then continue with the execution of the next instruction, without waiting for the data to be written to and acknowledged by off-chip memory. Write buffers are especially useful in connection with internal cache operation, particularly caches of the write-through type.

Similarly, a read buffer is contained within the BIU to buffer incoming data from main memory or another subsystem that is communicated on the external bus, until such time as the microprocessor is able to receive and process the data.

However, particularly for modern microprocessors for which the core clock is many times faster than the bus clock, synchronization circuitry and techniques for effecting data transfer through the read and write buffers, from one clock domain to another, has become a complex operation. This complexity is especially acute for synchronization of data traveling from the faster clock domain of the microprocessor to the slower clock domain of the external bus, through the write buffers. Conventional approaches to synchronization often impact the data path itself, and thus limit the performance of the microprocessor and the system. For example, synchronization may be effected by way of a two-way handshaking arrangement, in which a bit is set and cleared on both sides of the buffer (i.e., both the fast clock side and the slow clock side) to indicate the validity of a transaction. The speed of the data transfer is, of course, directly affected by such a technique.

Optimization of the size of write and read buffers is also a difficult problem for modern microprocessors. While large buffers are useful in connection with large memory access transactions, the use of large buffers can become inefficient when performing smaller transfers (i.e., a small amount of data to transfer can occupy a large buffer, precluding its use for other transactions).

SUMMARY OF THE INVENTION

The invention may be implemented into a buffer organization in which multiple write buffers are implemented. Each of the write buffers generates a status code indicating the extent to which it is occupied, and thus the extent to which additional data may be written thereto. The status signals are controlled by a state machine responsive to receipt of write requests to the buffer, and also to receipt of acknowledge signals from main memory.

According to another aspect of the present invention, synchronization of the write buffer transactions is performed at the control level, rather than in the data path. This capability reduces the extent to which overhead time and signals must be included in the data stream of the transaction.

According to another aspect of the present invention, the write and read buffers may be internally snooped by the core, such that data written to the write and read buffers may be accessed by the core, thus eliminating the need for a main memory access in certain circumstances.

It is therefore an object of the present invention to provide a microprocessor architecture that provides the benefit of maximum efficiency of read and write transactions by the core.

It is a further object of the present invention to provide such an architecture in which synchronization between clock domains does not affect the data transfer rate.

It is a further object of the present invention to provide such an architecture in which allows efficiencies in memory read operations of data stored in the write and read buffers.

Other objects and advantages of the present invention will be apparent to those of ordinary skill in the art having reference to the following specification together with its drawings.

DETAILED DESCRIPTION OF THE PREFERRED EMBODIMENT

Figure 1A:
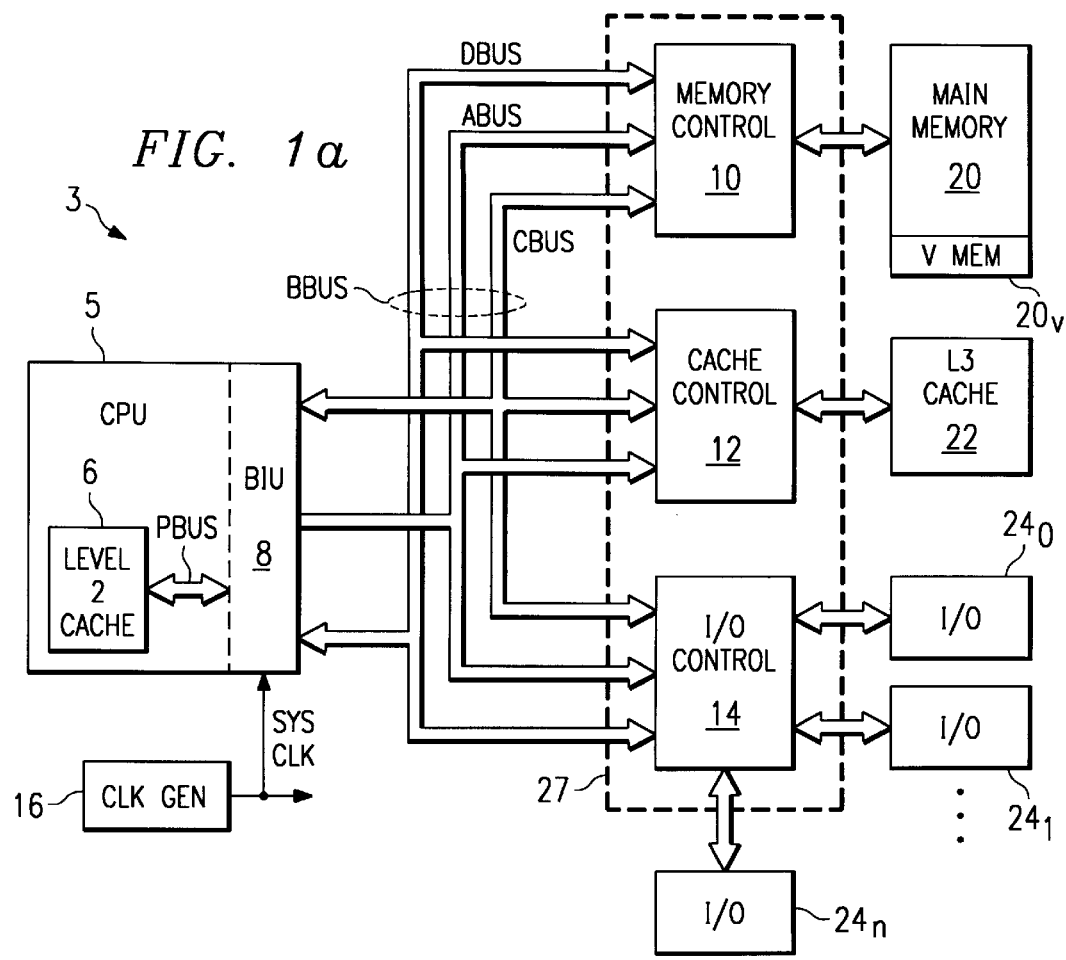
FIG. 1a is an electrical diagram, in block form, of a microprocessor-based system including a microprocessor according to the preferred embodiment of the invention.

Referring to FIG. 1a, an exemplary microprocessor-based system 3 into which the preferred embodiment of the present invention is implemented will now be described in detail. As shown in FIG. 1a, system 3 includes microprocessor 5 which, in this embodiment of the invention, is a microprocessor of the well-known "x86-architecture", and is preferably a Pentium-class microprocessor. Microprocessor 5 serves as the central processing unit (CPU) of system 3, and includes, as a portion thereof, bus interface unit (BIU) 8. BIU 8 is circuitry within microprocessor 5 which serves to control and effect communication between microprocessor 5 and the remainder of system 3. In this embodiment of the invention, BIU 8 of CPU 5 is connected to bus BBUS, which includes address bus ABUS, data bus DBUS, and control bus CBUS. As is conventional in the art, address bus ABUS is a bus upon which CPU 5 presents a binary address to access other elements of system 3, data bus DBUS is a bus for the communication of digital data between microprocessor 5 and the other system elements, and control bus CBUS is a bus by way of which control signals are communicated among the elements of system 3.

In system 3 of FIG. 1a, various peripheral elements are connected to bus BBUS, by way of associated controllers 10, 12, 14 implemented by way of chipset 27, to effect typical system functions. Main memory 21 of system 3 is coupled to bus BBUS by memory controller 10; as such, memory controller 10 receives address values and control signals from microprocessor 5, and presents corresponding control signals to main memory 20 to effect the desired operation, which generally involves the communication of data to or from microprocessor 5 on data bus DBUS. System 2 also includes level 3 cache memory 23, which is connected to cache controller 12 in the conventional manner; cache controller 12 is connected to bus BBUS to control the communication of data between microprocessor 5 and level 3 cache memory 23. In this example, level 3 cache memory 23 is a third level cache memory for system 3, with level 1 and level 2 cache memory present within microprocessor 5 (level 2 cache 6 being shown in FIG. 1a, connected to BIU 8 via internal bus PBUS). System 3 also includes I/O controller 14 which is connected to microprocessor 5 via bus BBUS, and which is also connected to several input/output devices 25. Input/output devices 25 may include typical input and output peripherals in system 2, such as a video monitor, a keyboard and pointing device, disk drive subsystems, and the like. System 3 further includes clock generator circuit 16, which is an oscillator or other circuit that generates a periodic clock signal on line SYSCLK for presentation to microprocessor 5 via BIU 8, and from which internal and external clock signals are generated within each of the various system elements. Accordingly, it is contemplated that system 3 corresponds to a typical modern computer, such as of the desktop workstation or portable notebook type, in which computer programs are stored within disk storage (represented by one of input/output devices 24), and downloaded to main memory 20 for operation.

Figure 1B:
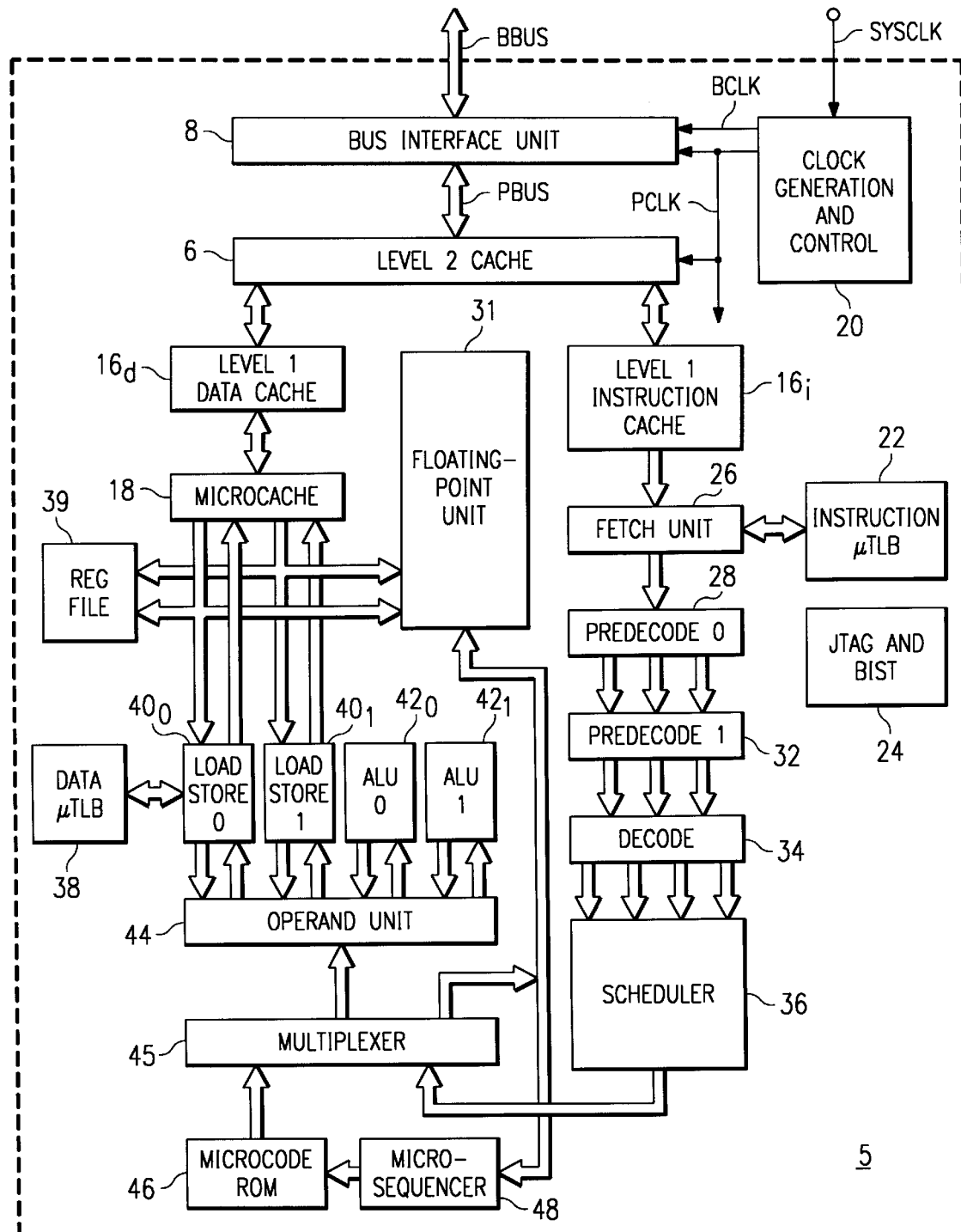
FIG. 1b is an electrical diagram, in block form, of a microprocessor incorporating the preferred embodiment of the invention.

Referring now to FIG. 1b, microprocessor 5 according to the preferred embodiment of the invention is illustrated in block diagram form, and will now be described. As noted above, microprocessor 5 includes bus interface unit (BIU) 8 connected to bus BBUS, which controls and effects communication between microprocessor 5 and the other elements in system 3. BIU 8 includes the appropriate control and clock circuitry to perform this function, including write buffers for increasing the speed of operation, and including timing circuitry so as to synchronize the results of internal microprocessor operation with bus BBUS timing constraints. Microprocessor 5 also includes clock generation and control circuitry 20 which, in this example, generates clock phases (e.g., internal high-speed clock PCLK and bus clock BCLK) based upon system clock SYSCLK from clock generator circuit 16. As will be described hereinbelow, the frequency of the generated clock phases may be selectably programmed as a multiple of the frequency of the external clock, including non-integer multiples thereof.

As is evident in FIG. 1b, microprocessor 5 has three levels of internal cache memory, with the highest of these as level 2 cache 6, which is connected to BIU 8 by way of internal bus PBUS. In this example, level 2 cache 6 is a unified cache, and is configured to receive all cacheable data and cacheable instructions from bus BBUS via BIU 8, such that much of the bus traffic presented by microprocessor 5 is accomplished via level 2 cache 6. Of course, microprocessor 5 may also effect bus traffic around cache 6, by treating certain bus reads and writes as "not cacheable". Level 2 cache 6, as shown in FIG. 1b, is connected to two level 1 caches 16; level 1 data cache $16_d$ is dedicated to data, while level 1 instruction cache $16_i$ is dedicated to instructions. Microcache 18 is a fully dual-ported level 0 data cache, in this example.

As shown in FIG. 1b, microprocessor 5 is of the superscalar type, and thus includes multiple execution units.

These execution units include two ALUs $42_0$, $42_1$ for processing conditional branch, integer, and logical operations, floating-point unit (FPU) 31, two load-store units $40_0$, $40_1$, and microsequencer 48. The two load-store units 40 utilize the two ports to microcache 18, for true parallel access thereto, and also perform load and store operations to registers in register file 39. Data microtranslation lookaside buffer ($\mu$TLB) 38 is provided to translate logical data addresses into physical addresses, in the conventional manner.

These multiple execution units are controlled by way of multiple pipelines of seven stages each, with write-back. The pipeline stages are as follows:

| | |
|---|---|
| F | Fetch: This stage generates the instruction address and reads the instruction from the instruction cache or memory |
| PD0 | Predecode stage 0: This stage determines the length and starting position of up to three fetched x86-type instructions |
| PD1 | Predecode stage 1: This stage extracts the x86 instruction bytes and recodes them into fixed length format for decode |
| DC | Decode: This stage translates the x86 instructions into atomic operations (AOps) |
| SC | Schedule: This stage assigns up to four AOps to the appropriate execution units |
| OP | Operand: This stage retrieves the register operands indicated by the AOps |
| EX | Execute: This stage runs the execution units according to the AOps and the retrieved operands |
| WB | Write-back: This stage stores the results of the execution in registers or in memory |

Referring back to FIG. 1b, the pipeline stages noted above are performed by various functional blocks within microprocessor 5. Fetch unit 26 generates instruction addresses from the instruction pointer by way of instruction microtranslation lookaside buffer ($\mu$TLB) 22, for application to level 1 instruction cache $16_i$. Instruction cache $16_i$ produces a stream of instruction data to fetch unit 26, which in turn provides the instruction code to predecode 0 stage 28 and predecode 1 stage 32 in the desired sequence. These two stages operate as separate pipeline stages, and together operate to locate up to three x86 instructions and apply the same to decoder 34. Predecode 0 stage 28 determines the size and position of as many as three variable-length x86 instructions, while predecode 1 stage 32 recodes the multi-byte instructions into a fixed-length format to facilitate decoding. Decode unit 34, in this example, contains four instruction decoders, each capable of receiving a fixed length x86 instruction from predecode 1 stage 32 and producing from one to three atomic operations (AOps), which are substantially equivalent to RISC instructions. Scheduler 36 reads up to four AOps from the decode queue at the output of decode unit 34, and assigns these AOps to the appropriate execution units. Operand unit 44 receives an input from scheduler 36 and also from microcode ROM 46, via multiplexer 45, and fetches register operands for use in the execution of the instructions. In addition, according to this example, operand unit 44 also performs operand forwarding to send results to registers that are ready to be stored, and also performs address generation for AOps of the load and store type.

Microsequencer 48 and microcode ROM 46 control ALUs 42 and load/store units 40 in the execution of microcode entry AOps, which are generally the last AOps to execute in a cycle. In this example, microsequencer 48 sequences through microinstructions stored in microcode ROM 46, to effect control responsive to microcoded microinstructions such as complex or rarely-used x86 instructions, x86 instructions that modify segment or control registers, handling of exceptions and interrupts, and multi-cycle instructions (such as REP instructions, and instructions that PUSH and POP all registers).

Microprocessor 5 also includes circuitry 24 for controlling the operation of JTAG scan testing, and of certain built-in self-test (BIST) functions, ensuring the validity of the operation of microprocessor 5 upon completion of manufacturing, and upon resets and other events.

As noted above, BIU 8 provides the function of communicating data between internal portions of microprocessor 5 and the remainder of the system. As such, BIU 8 communicates data between internal bus PBUS and external bus BBUS, through buffer functions commonly referred to as write buffers or read buffers, depending upon the direction of data transfer effected by each. In this example of microprocessor 5, internal bus PBUS is clocked according to a high speed internal clock PCLK, while external bus BBUS is clocked according to a lower speed bus clock BCLK.

Figure 2:
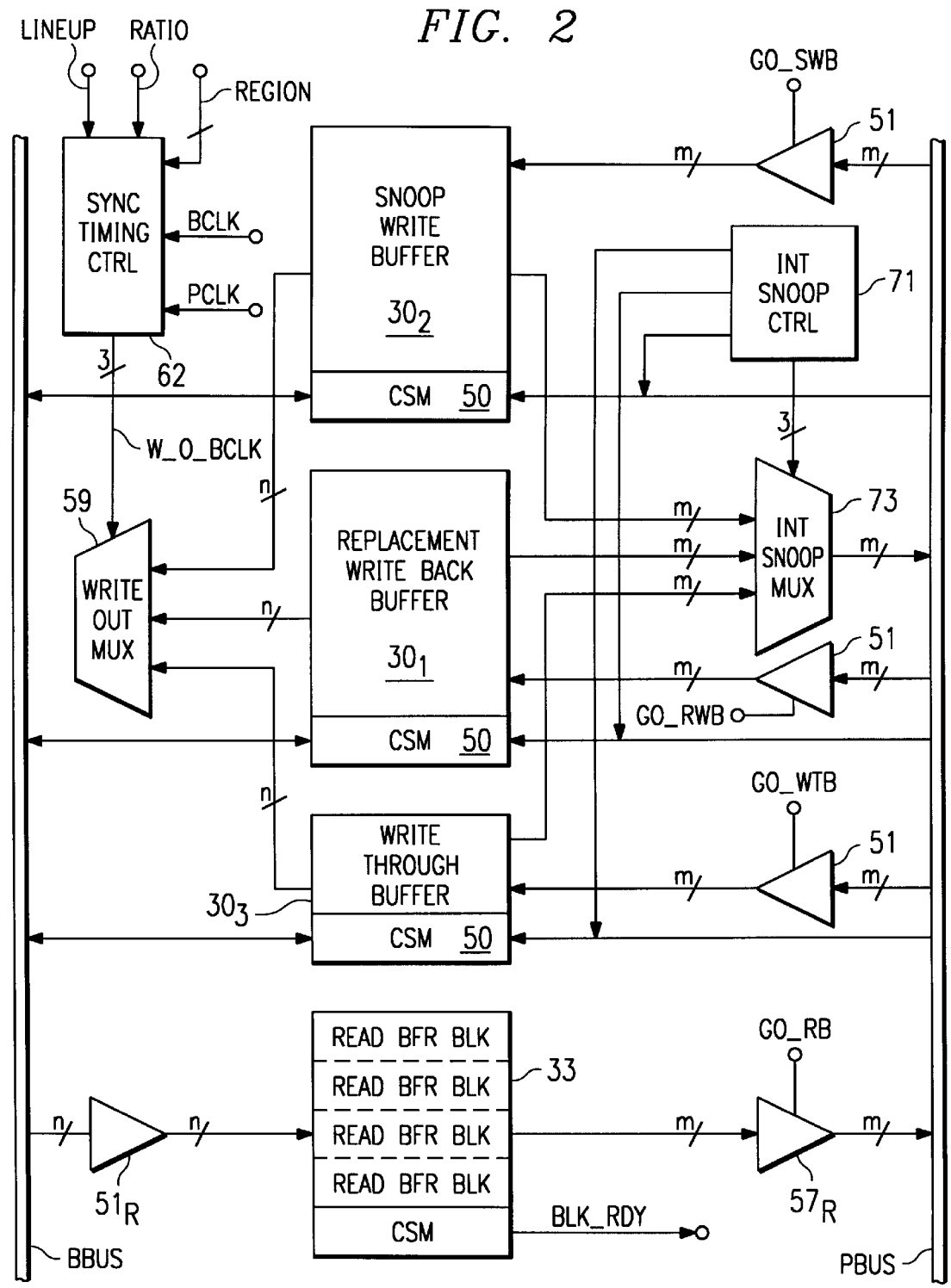
FIG. 2 is an electrical diagram, in block form, of the datapath portion of the bus interface unit of the microprocessor of FIG. 1b.

Referring now to FIG. 2, the organization of write buffers 30 and read buffer 33 in microprocessor 5 according to the preferred embodiment of the invention will now be described. According to this embodiment of the invention, multiple write buffers 30, of varying size and function, are included within BIU 8 for communication of data from bus PBUS generated by the core of microprocessor 5 to external subsystems via bus BBUS. Read buffer 33 is also included in BIU 8, for communication of data from bus BBUS to bus PBUS. As noted above, internal bus PBUS is typically a wide bus (e.g., 256 data bits in parallel) that operates synchronously with the high speed internal clock (e.g., core clock PCLK) while external bus BBUS is a smaller bus (e.g., 64 data bits in parallel) operating synchronously with a slower bus clock BCLK. As will be further noted hereinbelow, the frequency of internal clock signal PCLK may be an integer or non-integer multiple, for example in a range from about 2 to about 4, of the frequency of bus clock BCLK.

The set of write buffers 30 in BIU 8 of microprocessor 5 according to this embodiment of the invention include, in this example, two 512-bit write buffers $30_1$, $30_2$, and one 128-bit write buffer 303; BIU 8 also includes one 256-bit read buffer 33. Each entry in each of write buffers 30 and read buffer 33 stores, in combination with the data word, a tag value consisting of only the higher order portion of the main memory address to or from which the data in the corresponding data entry is communicated. According to this preferred embodiment of the invention, the tag value corresponds to the higher order bits of the starting address; all subsequent addresses are then calculated from the tag value according to a preselected burst sequence, substantially by counting address increments for each data entry. Buffer $30_1$ is a replacement writeback buffer for holding a single superline (i.e., a pair of thirty-two byte lines) from on-chip cache 6, or alternatively for storing a pair of single 32-byte lines or any smaller cache line segments ranging to as low as the data width of the external bus (which is 64 bits, or eight bytes, in this example). Replacement writeback buffer $30_1$ is used, in this example, only for storing an entry (superline, line, or line portion) that has been modified in cache 6 (but not in main memory 21) and that is being replaced by another entry. Write buffer 302 is a snoop write buffer that holds a single super line of 512 bits or two 256-bit lines from cache 6 that is being written to external bus BBUS in response to an external snoop (inquire) cycle. In this exemplary embodiment, buffer $30_3$ is a writethrough buffer, and as such is intended to buffer data being written from load/store unites 40 to main memory 21; the organization of writethrough buffer $30_3$ is as four entries of up to eight bytes each. While the write buffers 30 in this example are described has being associated with particular functions, it is of course to be understood that the multiple buffers need not be dedicated to specific functions, or may alternatively be dedicated to other communication functions, and still benefit from the present invention.

Write buffers 30 each receive data and tag information from bus PBUS via an associated receiver 51 (communicating multiple bits in parallel) that is under the control of signals GO_WTB, GO_WRWB, GO_WSWB generated by timing and control circuitry 20 in microprocessor 5. Conversely, write buffers 30 each present data and address information to bus BBUS via write-out multiplexer 59 under the control of synchronization timing control 62, in a manner that will be described in further detail hereinbelow.

On the read side, read buffer 33 is a 256-bit read buffer in which incoming data from external bus BBUS is temporarily stored until the core of microprocessor 5 is ready to receive the data. In this preferred embodiment of the invention, eight bytes of data are transferred into read buffer 33 at a time, given the 64-bit data width of external bus BBUS. Each block of eight bytes is, of course, smaller than a cache line (which is 256 bytes for a single line, or 512 bytes for a superline). Read buffer 33 has four locations, each storing an eight-byte block of data communicated from bus BBUS by receiver $51_R$. Upon receipt of an eight-byte block, read buffer 33 asserts a signal on line BLCK_RDY to an execution stage (ALUs 41 or load/store unit 40) of microprocessor 5, indicating that a block of data is ready for receipt by the execution unit. Read buffer 33 then presents the block of data to bus PBUS via driver $57_R$ in response to a request signal on line GO_RB asserted (directly or indirectly) by the appropriate execution unit. This operation of read buffer 33, in signaling the core that a block of data is available for execution, reduces pipeline wait time in the execution of instructions upon data stored in external memory, as execution can begin upon receipt of the first block of data from read buffer 33, without requiring the receipt of an entire cache line of data from external bus BBUS.

Each of bus interface buffers 30, 33 also includes control state machine (CSM) 50 for controlling the transfer of data through its corresponding bus interface buffer 30, 33 between bus PBUS and bus BBUS. In general, the overall control of BIU 8 ensures that only one buffer 30, 33 is driving any one of buses BBUS, PBUS at any one time, to avoid bus conflicts. Control state machine 50 receives and presents control signals to and from both buses BBUS and PBUS according to a handshaking protocol as will now be described relative to FIG. 3 for the case of replacement writeback buffer $30_1$, by way of example. The other ones of write buffers $30_2$, $30_3$ will be similarly constructed.

Figure 3:
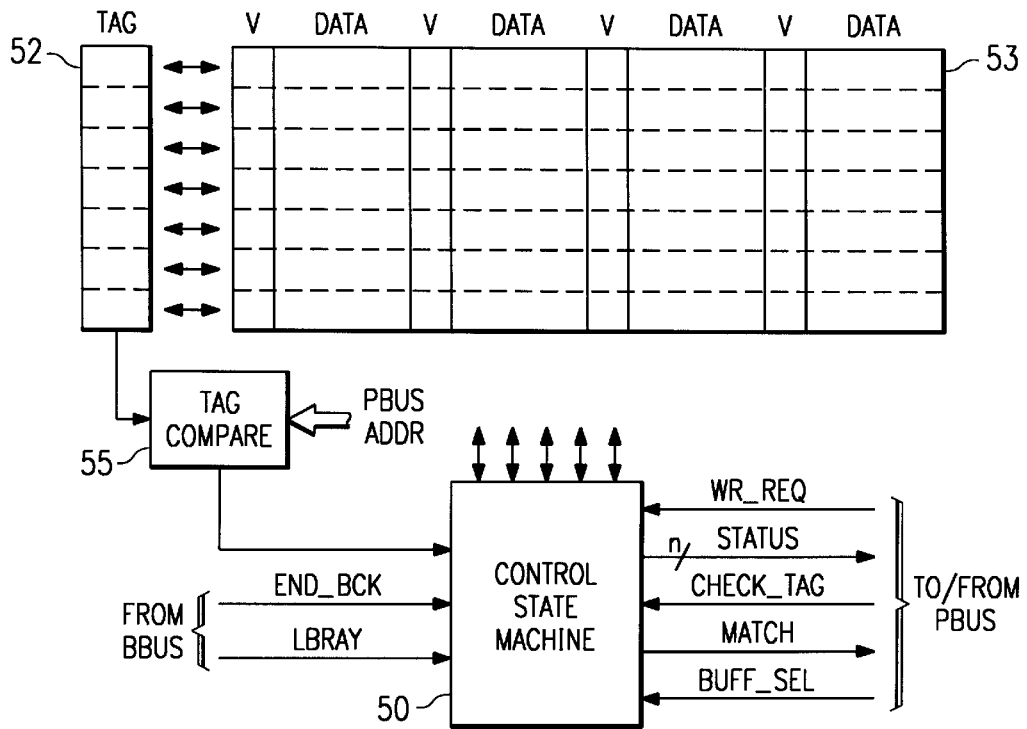
FIG. 3 is a block diagram illustrating the components of one of the write buffers in the bus interface unit of FIG. 2.

As noted above, replacement writeback buffer $30_1$ is a 512-bit write buffer, and as such is larger than the 256-bit size of bus PBUS. As illustrated in FIG. 3 and as noted above, write buffer $30_1$ includes multiple entries, each having a tag portion 52 associated with multiple data entries and corresponding valid bits V in data portion 53. According to this preferred embodiment of the invention, significant area is saved by not storing a tag for each of the lines stored in the write buffer 33, but instead storing one tag for multiple entries from which subsequent tags may be dynamically calculated. Indeed, it is contemplated that one may store only a single tag value in each write buffer 30, from which the tags for other lines may be dynamically calculated. Alternatively, a tag value may be associated with each entry, if desired. Replacement writeback buffer $30_1$ includes tag comparator 55 for comparing the address presented on bus PBUS against the contents of tag portion 52 to determine if a match is present, as will be described in further detail hereinbelow Control state machine 50 controls the operation of replacement writeback buffer $30_1$ to effect writes thereinto from bus PBUS and to effect writes of its contents to main memory 21 via bus BBUS. According to this preferred embodiment of the invention, certain special control signals are provided to indicate the status of replacement writeback buffer $30_1$ to the core of microprocessor 5. Control state machine 50 receives a signal from bus BBUS on line END_BCK which indicates, when asserted, that a write-out transaction from replacement writeback buffer $30_1$ to main memory 21 is complete. Control state machine 50 also receives a control input on line WR_REQ from bus PBUS that indicates, when asserted, that data is to be written to replacement writeback buffer $30_1$. According to the preferred embodiment of the invention, control state machine 50 generates a code on lines STATUS, presented to bus PBUS, that communicates the remaining capacity of replacement writeback buffer $30_1$ for additional writes.

Figure 4:
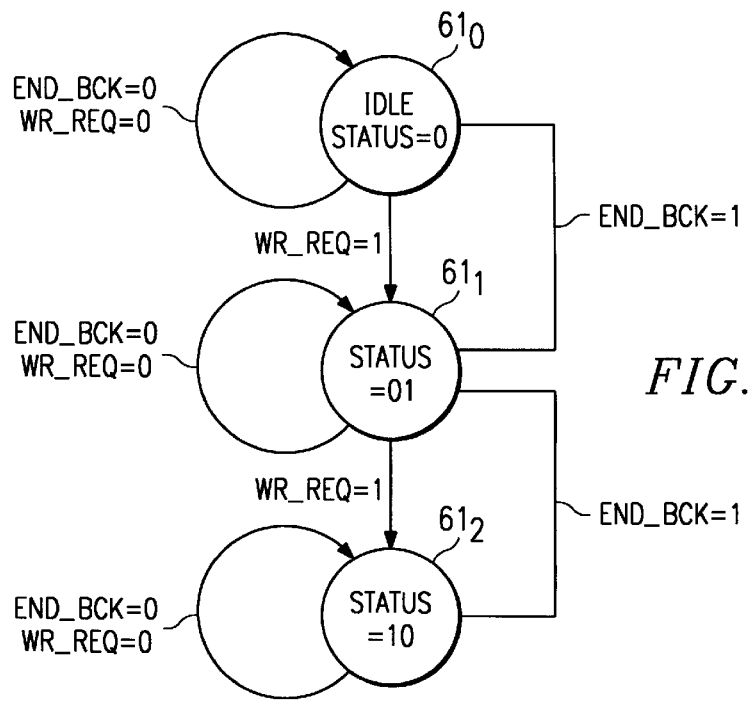
FIG. 4 is a state diagram illustrating the generation of control signals in the operation of an exemplary one of the write buffers of FIG. 3 according to the preferred embodiment of the invention.

Referring now to FIG. 4, the operation of control state machine 50 for a general case of a write buffer 30 will now be described in detail relative to a state diagram. In general, the size of the write buffer 30 may be much larger than the data width on bus PBUS. Accordingly, the control state machine 50 for a write buffer 30 will have a number of possible states equal to one plus the multiple by which its capacity exceeds the data width of bus PBUS.

In the example of write buffer $30_1$, since its capacity is 512 bits, or twice the PBUS width of 256 bits, control state machine 50 has three possible states $61_0$, $61_1$, $61_2$, and thus generates a status code on two STATUS lines. When write buffer $30_1$ is empty, control state machine 50 is in idle state $61_0$; in this state, control state machine 50 issues status code 00 on lines STATUS. An asserted request signal from bus PBUS on line WR_REQ (i.e., WR_REQ=1) indicates that the core is requesting a write of data to replacement writeback buffer $30_1$. This write operation will cause replacement writeback buffer $30_1$ to store up to 256 bits in each transfer. In response to this request signal, replacement writeback buffer $30_1$ will receive data, and store it in data portion 53 along with the corresponding tag value, and the appropriate valid bits V will be set. Once this write operation has completed, replacement writeback buffer $30_1$ is no longer empty, and control state machine 50 advances to state $61_1$. In state $61_1$, control state machine 50 presents status code 01 on lines STATUS, indicating that replacement writeback buffer $30_1$ is up to one-half full. Conversely, if control state machine 50 does not receive a request signal on line WR_REQ, it will remain in idle state $61_0$, and the status code on lines STATUS will remain at 00.

Upon completion of a write transaction from replacement writeback buffer $30_1$ to main memory 21, control state machine 50 will receive an asserted signal on lines END_BCK from bus BBUS. This signal indicates that, because at least one of the data entries of writethrough buffer $30_1$ has been written to main memory 21, an additional portion of writethrough buffer $30_1$ is available to receive new data. The valid bit V for the written data entries may now be reset. Upon receipt of the signal on line END_BCK, control state machine 50 returns to the next emptiest state from its current state. For example, if control state machine 50 is in state $61_1$ at the time of receipt of a signal on line END_BCK, it will return to idle state $61_0$ and present a status code of 00 on lines STATUS. If, however, another asserted request signal from bus PBUS is driven on line WR_REQ (i.e., WR_REQ=1), another write operation will be performed, and replacement writeback buffer $30_1$ will receive another set of data, store it in data portion 53 along with the corresponding tag value, and set the appropriate valid bits V. Once this write operation has completed, control state machine 50 advances to full state $61_2$, and presents status code 10 on lines STATUS, indicating that replacement writeback buffer $30_1$ may now be full.

In general (i.e., when the number of states exceeds three), the remainder of the states in the sequence of FIG. 4 would operate in the same manner. In general, control state machine 50 will advance to the next more full state upon receipt of an asserted signal on line WR_REQ, will return to the next more empty state upon receipt of an asserted signal on line END_BCK, and will remain in its current state if neither signal is received.

Control logic in BIU 8 of microprocessor 5 will receive the status code on lines STATUS. This control logic can decode the value of the status code, and from the decoded value, determine the remaining capacity of write buffers 30. This information is used in the selection of the portion of the appropriate write buffer 30 into which the next data transaction is to be written, based upon the amount of data to be written. For example, in a memory write operation, the operative one of load/store units 40 will indicate the length of the word to be written, and the control logic in BIU 8 will determine the capacity and location of the appropriate data entry in writethrough buffer $30_3$. Similarly, an entire super cache line of 512 bits may be written-back through two 256-bit writes to replacement writeback buffer $30_1$ if available.

As described hereinabove, multiple write buffers 30 of various sizes and function are provided within BIU 8 according to this embodiment of the invention. According to this embodiment of the invention, BIU 8 can select the appropriate write buffer 30 to receive the new data block, based upon the lines STATUS from each write buffer 30 to ensure that each is used for maximum occupancy.

As noted above, bus PBUS operates synchronously with a high speed clock signal PCLK, and bus BBUS operates synchronously with a lower speed clock signal BCLK. Accordingly, the operation of write buffers 30 must be controlled in such a way that data is not lost when communicated from one clock domain to another. This problem is exacerbated in the case of a non-integer ratio of the frequency between a faster clock signal, such as an internal core clock, and a slower clock signal, such as a bus clock, because the phase relationship between clocks will not remain constant over each cycle of the slower clock signal. For example where the clock ratio is 16/6, the delay between a rising edge of the faster clock signal to the next rising edge of the slower clock signal may vary widely; data that is being communicated from the fast clock domain to the slow clock domain must be held for two additional clock edges before transfer in some cases, but may not need to be held at all in other cases. This variability in the delay period for translation of a clock signal from a faster clock domain to a slower clock domain generally requires the use of worst case design constraints, according to conventional techniques Referring back to FIG. 3, control state machine 50 is implemented, according to the preferred embodiment of the invention, to effect this synchronization in such a way as to not directly affect the data path. As shown in FIG. 3, control state machine 50 generates a status code on lines STATUS to indicate its full or partial availability to receive new data. Lines STATUS and WR_REQ are in the so-called PCLK domain, as they are part of bus PBUS and are synchronous with clock signal PCLK. Conversely, line END_BCK is in the BCLK domain, as it is presented with bus BBUS synchronously with clock signal BCLK. Of course, a write from one of write buffers 30 to main memory 21 should not be performed until a write thereinto is completed, or the possibility of a false write may occur. According to this preferred embodiment of the invention, synchronization of this control function is effected in a way that does not affect the data path, as will now be described.

Figure 5:
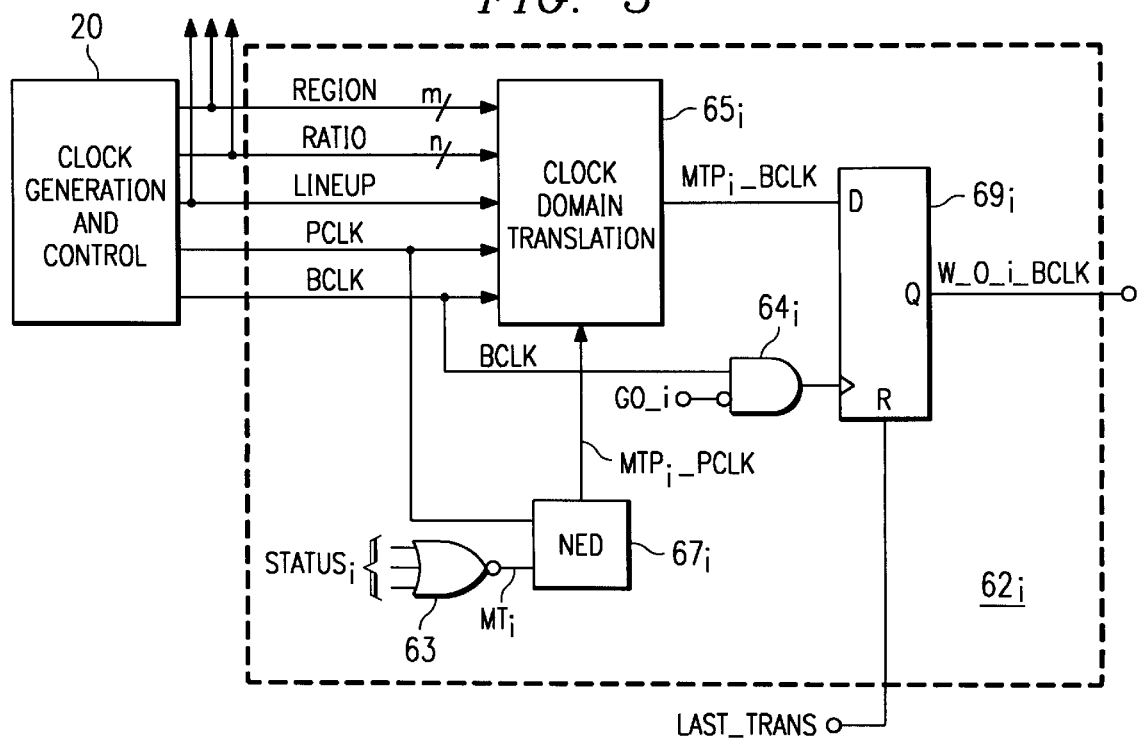
FIG. 5 is an electrical diagram, in block and schematic form, of synchronization timing control circuitry for one of the write buffers of the bus interface unit of FIG. 3.

Referring now to FIG. 5, the construction and operation of timing control circuitry $62_i$ that ensures proper control synchronization will now be described in detail as applied to one of write buffers $30_i$ by way of example. As shown in FIG. 5, timing control circuitry $62_i$ is directed to synchronization of the write operations, and receives signals from clock generation and control circuit 20 that indicate the relationship of the two clock signals PCLK, BCLK to one another. While timing control circuitry $62_i$ for only one of write buffers $30_i$ is shown in FIG. 5, it is to be understood that similar circuitry will be provided for each of write buffers 30 in BIU 8.

As noted in FIG. 1b, clock generation and control circuit 20 generates clock signals PCLK, BCLK (and may generate other clock signals, not shown, for use within microprocessor 5), based upon the external clock signal SYSCLK presented thereto. Clock BCLK is generated by clock generation and control circuit 20 to serve as the bus clock signal for synchronous operation of external bus BBUS by microprocessor 5 itself, and is presented externally for use also by the other subsystems connected to bus BBUS. Clock generation and control circuit 20 also generates signals on lines REGION that indicate the current phase relationship of the two clock signals PCLK, BCLK, on lines RATIO that indicate the current frequency ratio between the two clock signals PCLK, BCLK, and on line LINEUP that indicates when the two clock signals PCLK, BCLK are phase-aligned with one another. Lines REGION, RATIO, and LINEUP are presented to clock domain translation circuit 65i in timing control circuitry $62_i$, as are the clock signals PCLK, BCLK.

In addition to clock domain translation circuit $65_i$, timing control circuitry $62_i$ includes negative edge detector circuit $67_i$, AND gate $64_i$, and register output $69_i$. Negative edge detector $67_i$ receives line $MT_i$, which is the logical NOR of lines $STATUS_i$ generated by control state machine $50_i$ for its associated write buffer $30_i$; as such, line $MT_i$ is asserted high whenever its write buffer $30_i$ is empty (i.e., none of lines $STATUS_i$ being high), and driven low whenever its write buffer $30_i$ is in a state other than the idle state $61_0$, indicating that at least one entry is valid therein. Negative edge detector $67_i$ also receives clock signal PCLK, and generates a pulse on line $NMTP_i\_PCLK$ to clock domain translation circuit 65 responsive to line $MT_i$ making a high to low translation, which occurs when write buffer 30 goes from an empty state (i.e., idle state $61_0$) to a not-empty state upon receipt of a data entry. Clock domain translation circuit $65_i$ translates the signal on line $NMTP_i\_PCLK$, which is in the PCLK domain, to a signal in the BCLK domain on line $NMTP_i\_BCLK$, as will be described hereinbelow. Line $NMTP_i\_BCLK$, along with clock signal BCLK and a reset signal on line LAST_TRANS, are presented to register output $69_i$ in timing control circuitry $62_i$ for write buffer $30_i$, which generates an output signal on line W_O_i_BCLK that, when asserted, requests a write operation from write buffer $30_i$ to main memory 21 via bus BBUS.

Timing control circuitry $62_i$ thus controls the requesting of a write operation to main memory in a synchronized manner, based upon the receipt of a data entry in its associated write buffer $30_i$. This control is effected, as will be evident from the foregoing description, in a way in which synchronization does not affect the transmission of data in the data path, but rather by way of synchronizing control signals.

Figure 6:
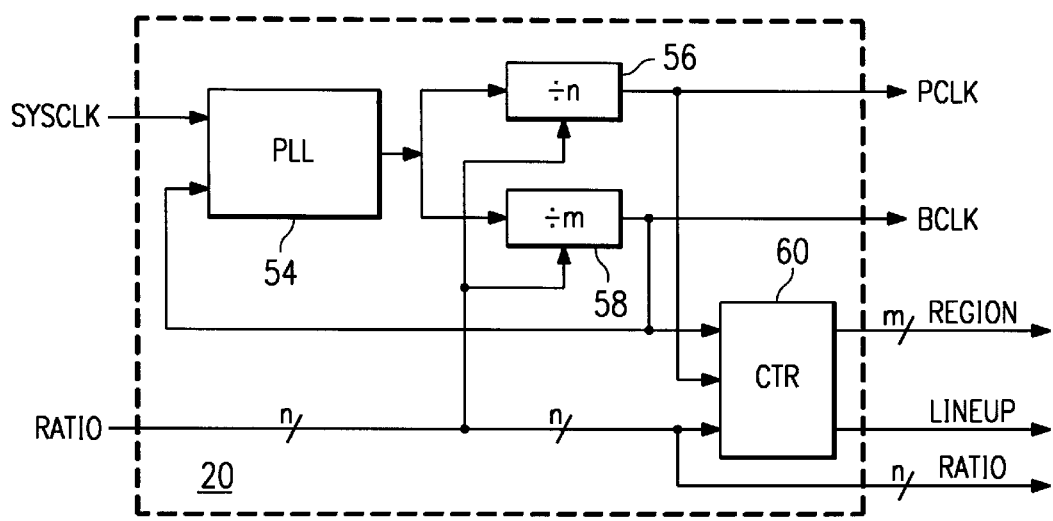
FIG. 6 is an electrical diagram, in block form, of clock generation and control circuitry in the microprocessor of FIG. 1b.

Referring now to FIG. 6, the construction of clock generation and control circuit 20 according to this preferred embodiment of the invention will now be described. Clock generator circuit 20 includes phase-locked loop (PLL) 54 constructed in the conventional fashion. PLL 54 receives the external clock signal SYSCLK at one input, and provides an output to each of frequency dividers 56, 58. Frequency dividers 56, 58 are preferably programmable frequency dividers for dividing the frequency of the output of PLL 54 by values n, m respectively, as provided on lines RATIO from a configuration register in microprocessor 5. The values n and m may be integer or non-integer values, and may be either greater or less than unity. In this example, the value m is greater than n, such that the output of frequency divider 58 on line BCLK is at a lower frequency than the output of frequency divider 56 on line PCLK. The output clock signal on line BCLK is presented as a feedback input to PLL 54.

The values of m, n that are selected for use in clock generator and control circuit are, as noted above, preferably programmed into a configuration register, or into another memory or register used in the control of microprocessor 5. According to this embodiment of the invention, it is preferable that the values of m, n be selected according to a selected one of a group of ratio values. The present invention provides great flexibility in the relative clock frequencies of PCLK, BCLK, however. For example, clock ratios of 1, 2, 3, 5/3,8/3,5/2,7/2 are contemplated for use in connection with the preferred embodiment of the invention. It has been observed that, for purposes of controlling communications through clock domain translation circuit 65 between clock domains, the 1/16 (or 8/3) clock ratio is the worst case ratio from the above set, as it results in the highest number of possible phase regions as compared to the other clock ratios in this set.

According to this preferred embodiment of the invention, clock generator and control circuit 20 also includes counter 60 which determines the phase relationship between clock signals PCLK, BCLK, and generates signals on lines REGION and LINEUP. Lines REGION are, in this embodiment of the invention, three signal lines carrying a value indicating the current phase relationship of clock signals PCLK, BCLK since eight distinct phase regions are possible; line LINEUP is, in this example, a single line for carrying a signal indicating when the rising edges of clock signals PCLK, BCLK coincide. Counter 60 may be implemented as a conventional counter that counts edges of the faster clock signal PCLK, and thus counts phase regions, up to a limit determined by the clock ratio presented thereto on lines RATIO. For the example of a 16/6 clock ratio, the count limit of counter 60 will be eight, since there are eight phase regions between each instance of coincident rising edges of clock signals PCLK, BCLK.

Figure 7:
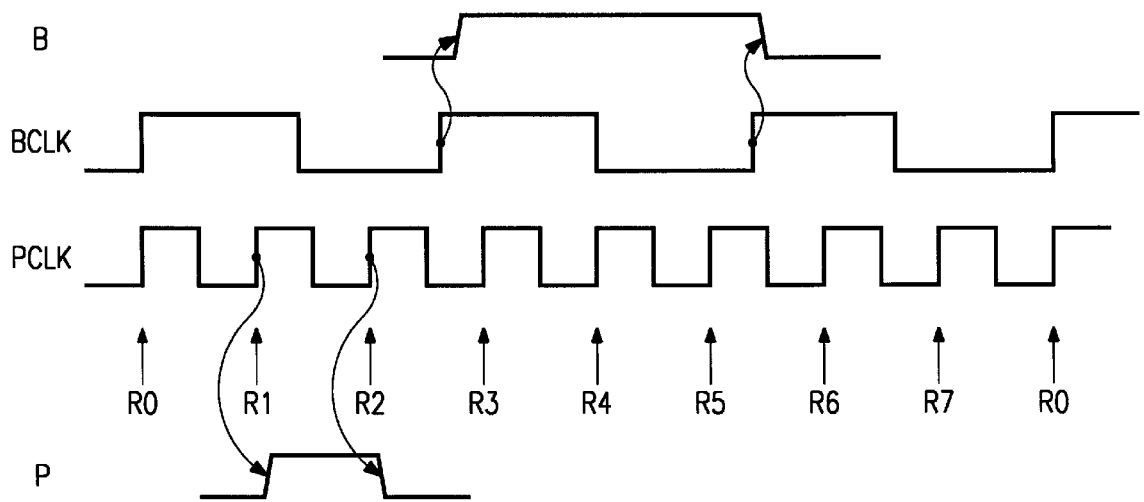
FIG. 7 is a timing diagram illustrating various phase relationships between clock signals of different frequency in the microprocessor of FIG. 1b.

Attention is now directed to FIG. 7, which illustrates the phase relationship of the two clock signals PCLK, BCLK, in combination with the translation of a control signal from bus PBUS to bus BBUS. According to this embodiment of the invention, as is typical for synchronous digital logic circuits and systems, the state of a signal on a synchronous bus is presented synchronously with a clock edge, and remains valid for a period of time corresponding to a cycle of its corresponding clock edge. For example, as shown in FIG. 7, control signal P becomes valid on bus PBUS immediately after a rising edge of clock signal PCLK, as this control signal P is clocked from its source onto bus PBUS by that rising edge. Bus PBUS holds control signal P as valid until the next rising edge of clock signal PCLK, at which control signal P may return to its prior state onto bus PBUS. Bus BBUS operates in a similar fashion, as shown in FIG. 7, as valid control signal B is clocked from its source bus master onto bus BBUS with a rising edge of clock signal BCLK, and remains on bus BBUS until the next edge of clock signal BCLK when, in this example, the end of control signal B is clocked onto the bus.

Referring to FIG. 7, the various phase regions presented by the worst case 16/6 clock ratio according to the preferred embodiment of the invention will now be described. This clock ratio is the worst case in that it results in the highest number of phase relationship regions for the set of clock ratios listed hereinabove. It is contemplated, of course, that one of ordinary skill in the art having reference to this specification will be able to similarly identify the various phase regions between clocks of different speeds for different clock ratios than that presented herein.

It will become apparent, from the following description, that the various phase relationships of the BCLK and PCLK clock signals most directly affect the transfer of signals from the faster PCLK dock domain to the slower BCLK clock domain. This is because additional rising edges of the faster PCLK clock signal may occur after signals are presented in the PCLK domain, but before the next rising edge of the slower BCLK clock signal. Conversely, for signal translation from the slower BCLK clock domain to the faster PCLK clock domain, a rising edge of the faster destination clock domain clock signal PCLK will always occur prior to the next rising edge of the slower BCLK clock signal in the source domain. As such, the effect of the various phase regions in the example shown in FIG. 7 will be described for signal translation from the faster PCLK clock domain to the slower BCLK clock domain. In each case, counter 60 presents a signal indicating the current phase region on lines REGION.

FIG. 7 illustrates the phase relationship between the faster clock signal PCLK and the slower clock signal BCLK as generated by clock generation and control circuit 20 over a series of clock cycles, beginning with a cycle in which clock signals BCLK, PCLK are in phase alignment with one another. This coincidence of the rising edges of PCLK and BCLK corresponds to phase region R0, as will be indicated on lines REGION by a 0 value and by an asserted signal on line LINEUP, both generated by counter 60. In this case, a signal presented onto bus PBUS by a rising edge of clock signal PCLK will not have propagated through clock domain translation circuit 65 until after the coincident rising edge of clock signal BCLK is complete. As such, control signal P must be held, by clock domain translation circuit 65 in this example, for two additional cycles of PCLK before the next rising edge of clock signal BCLK occurs.

The next cycle of the faster clock signal PCLK, after the lineup condition of phase region R0, is shown in FIG. 7 as phase region R1; in this region, any signals to be communicated by clock domain translation circuit 65 from the PCLK domain to the BCLK domain must be held for an additional rising edge of the PCLK signal before the next rising edge of clock signal BCLK occurs. The next cycle of clock signal PCLK is shown in FIG. 7 as phase region R2, in which signals in the PCLK domain presented with this edge will be received by the next rising edge of clock signal BCLK, which occurs prior to the next rising edge of clock signal PCLK.

The next cycle of clock signal PCLK is in phase region R3. In this region, any signal in the PCLK domain must be held for the next two rising edges of the PCLK clock signal occurring prior to the next rising edge of the BCLK clock signal. The next cycle of clock signal PCLK corresponds to phase region R4 which, similarly as phase region R1, requires the signal to be held for one additional cycle of clock signal PCLK. The next cycle of clock signal PCLK is in phase region R5, in which the signal need only be held for the present cycle, as a rising edge of clock signal BCLK will occur prior to the next PCLK rising edge. The remaining cycles of clock signal PCLK correspond to phase regions R6, R7 in which the signal from the PCLK domain is held for one additional PCLK clock cycle. The following cycle of clock signal PCLK is thus in a lineup condition, and the eight phase region cycle for this example of the 16/6 clock ratio then repeats.

Figure 8A:
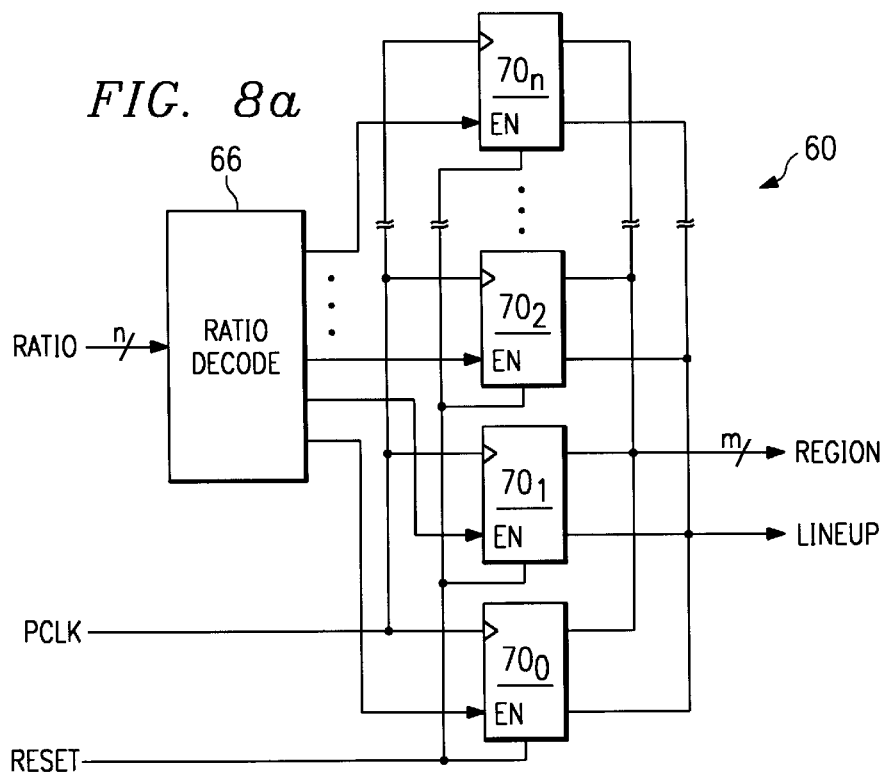
FIG. 8a is an electrical diagram, in schematic form, of the counter in the circuit of FIG. 6.
Figure 8B:
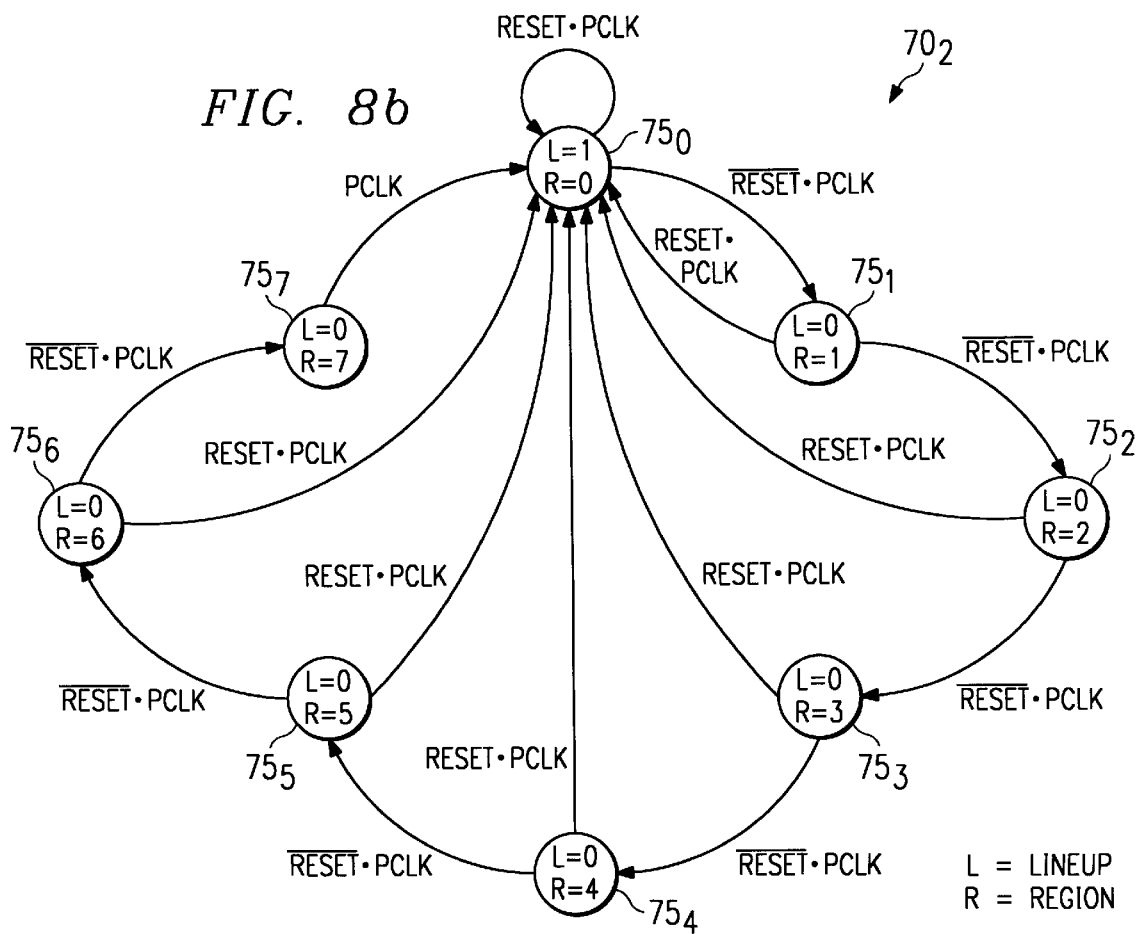
FIG. 8b is a state diagram illustrating the operation of the counter of FIG. 8a for a selected clock ratio.

Given the above description of the phase regions for this clock ratio, FIGS. 8a and 8b illustrate the construction of counter 60 according to the preferred embodiment of the invention. As shown in FIG. 8a, counter 60 includes multiple state counters 70, one for each possible clock ratio. Each of state counters 70 has a reset input receiving a signal on line RESET, a clock input receiving clock signal PCLK, and an enable input. Ratio decoder 66 receives the clock ratio signal on lines RATIO, and asserts one of its outputs responsive to the value of the clock ratio signal. The outputs of ratio decoder 66 are connected to respective ones of state counters 70. Each state counter 70 presents multiple outputs which are wired-OR connected to drive a phase region signal on lines REGION. Each state counter 70 is preferably implemented in sequential logic which advances from one state to the next responsive to an edge of clock signal PCLK. Lines REGION will typically drive a digital encoded signal with the phase region driven by the enabled one of state counters 70; the non-enabled state counters 70 will have their outputs forced low, given the wired-OR output connection. Each of state counters 70 also drive a signal at another output, wired-OR connected among state counters 70 to drive line LINEUP. State counters 70 are resettable responsive to line RESET, preferably generated by PLL 54, based upon which operation may be initiated in the proper phase region.

Referring now to FIG. 8b, the operation of state counter $70_2$, operable for the worst case clock ratio of 16/6, will now be described in detail by way of a state diagram, by way of example. It is contemplated that state counters 70 for other clock ratios may readily be constructed by one of ordinary skill in the art having reference to this specification. In the clock ratio of 16/6, clock signals PCLK, BCLK may be in any one of eight phase relationships, as will be described in further detail hereinbelow. As such, state counter $70_2$ has eight states $75_0$ through $75_7$. State counter 70 thus issues three output lines REGION, upon which the phase region value will be digitally encoded, and will issue a single output on line LINEUP.

As shown in FIG. 8b, in reset state $75_0$, state counter $70_2$ will issue a high logic level on line LINEUP and will issue a 000 value on lines REGION (indicating phase region R0). Upon the next edge of clock signal PCLK in combination with line RESET not being asserted, state counter will advance to state $75_1$ and issue a low logic level on line LINEUP and the digital value 001 on lines REGION, corresponding to phase region R1. Another edge of clock signal PCLK in combination with the absence of a reset signal (i.e., line RESET being low) advances state counter $70_2$ to state $75_2$, driving line LINEUP low and driving a digital value of 010 (indicating phase region R2) on lines REGION. Additional edges of clock signal PCLK in the absence of a reset will advance the state of state counter 70 in similar fashion, advancing the digital value of the output on lines REGION and maintaining line LINEUP low. In any state, if line RESET is asserted in combination with an edge on clock signal PCLK, control returns to state $75_0$ (line LINEUP high and REGION value of 000). Once state $75_7$ is reached, the edge of clock signal PCLK will unconditionally advance to state $75_0$, asserting line LINEUP and setting a digital value of 000 on lines REGION to indicate phase region R0.

Based on the foregoing description, one may thus tabulate the various phase regions and signal hold operations for translation from the faster PCLK domain to the slower BCLK domain for this clock ratio as follows:

| Phase regions | State of state counter $70_2$ | Number of PCLK edges to hold signal |
| --- | --- | --- |
| R1, R4, R6, R7 | $75_1$, $75_4$, $75_6$ | Hold for one PCLK cycle |
| R0, R3 | $75_0$, $75_3$ | Hold for two PCLK cycles |
| R2, R5 | $75_2$, $75_5$, $75_7$ | Hold until next BCLK |

The control of signal translation by clock domain translation circuit 65 according to these operations will be described in further detail hereinbelow, for the case of the 16/6 clock ratio by way of example. Firstly, however, the construction of negative edge detector 67 will be briefly described, as the input signal to clock domain translation circuit 65 is provided thereby.

Figure 9:
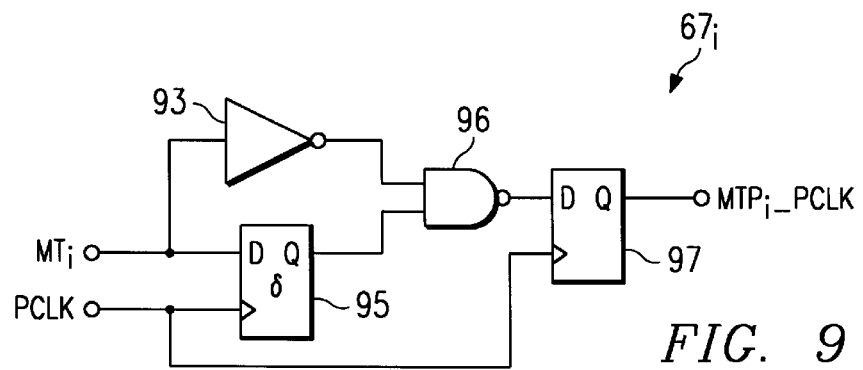
FIG. 9 is an electrical diagram, in schematic form, of the negative edge detection circuit in the timing control circuitry of FIG. 5.

FIG. 9 illustrates the construction of negative edge detector circuit $67_i$ according to this preferred embodiment of the invention. Negative edge detector circuit $67_i$ includes non-inverting delay stage 95 (implemented, in this embodiment, as a D-type flip-flop clocked by clock signal PCLK), which receives input signal line MT at its input. Line $MT_i$ is also applied, via inverter 93, to one input of NOR gate 96; the other input of AND gate 96 receives the output of delay stage 95. The output of AND gate 96 is applied to D-type flip-flop 97, which is also clocked by clock signal PCLK. The output of flip-flop 97 drives line $NMTP_i\_PCLK$.

In operation, negative edge detector circuit drives the input of flip-flop 97 with a low logic level except for a brief period of time after a falling edge of input line $MT_i$. This is due to inverter 93, which keeps the inputs of AND gate 96 at complementary levels in the steady-state. In the event that line $MT_i$ is originally at a high logic level, the output of inverter 93 will be low while the output of delay stage 95 is high. This, of course, forces the output of AND gate 96 to a low logic level. Upon line $MT_i$ making a high-to-low transition, the output of inverter 93 will switch to a high logic level, while the output of delay stage 95 remains at a high logic level until the new state of line $MT_i$ propagates therethrough (which, in this case, occurs after the next rising edge of clock signal PCLK plus the propagation delay of delay stage 95). Therefore, for this duration after a falling edge of line $MT_i$, a high logic level appears at the output of AND gate 96, is presented to the D input of flip-flop 97, and is latched into flip-flop 97 by the next rising edge of clock signal PCLK. This edge of clock signal PCLK will also clock the low logic level on line $MT_i$ into delay stage 95, and propagate to its output. This will cause AND gate 96 to then drive its output low again, and this low level will be clocked into and presented by flip-flop 97 upon the next rising edge of clock signal PCLK. Accordingly, a high-to-low transition on line $MT_i$ will cause a high logic level to appear on line $NMTP_i\_PCLK$ for a duration of approximately one cycle of clock signal PCLK.

Figure 10:
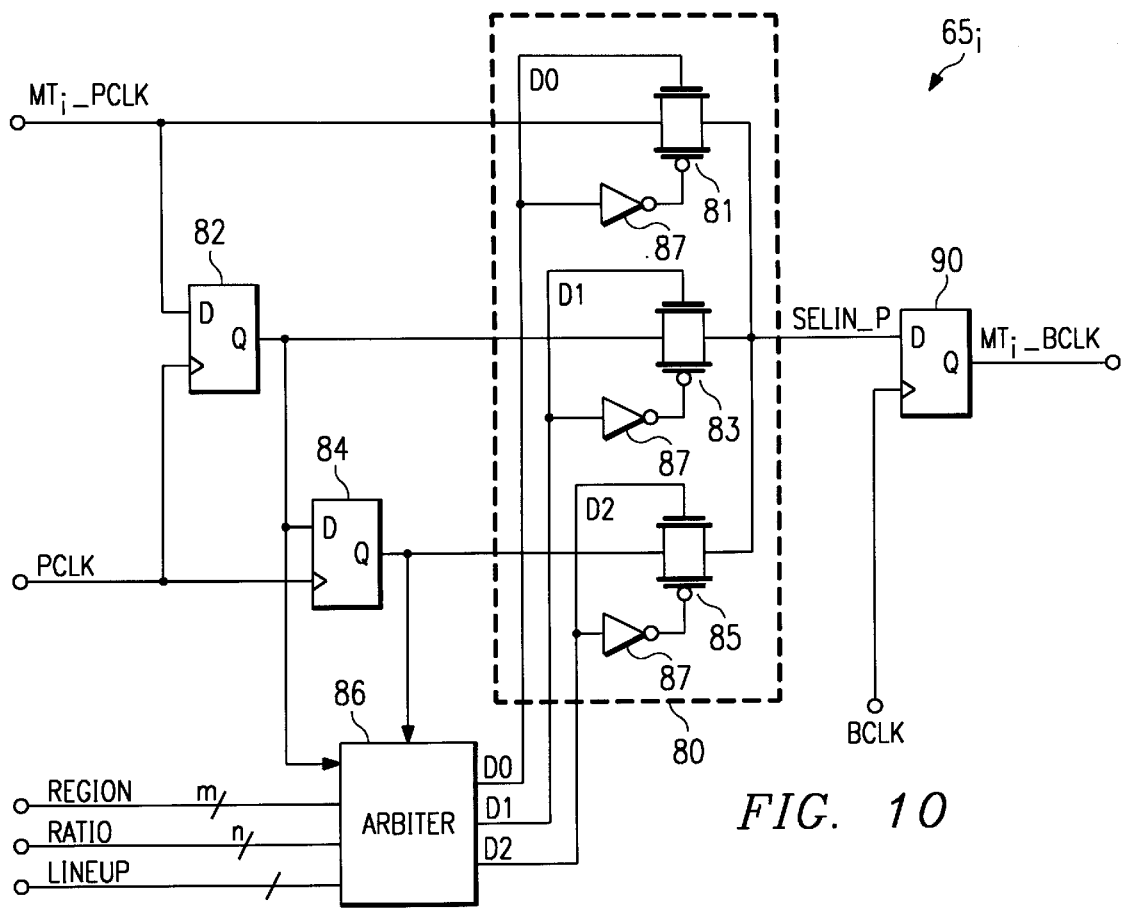
FIG. 10 is an electrical diagram, in schematic form, of the clock domain translation circuit in the timing control circuitry of FIG. 5.

Referring now to FIG. 10, the construction and operation of clock domain translation circuit $65_i$ in timing control circuitry $62_i$ will now be described in detail. As shown in FIG. 10, signal line $NMTP_i\_PCLK$ from negative edge detector $67_i$ is applied to pass gate 81 in multiplexer circuit 80, and also to the D input of register 82. The Q output of register 82 is applied to pass gate 83 in multiplexer 80, and also to the D input of register 84 (which has its Q output applied to pass gate 85 in multiplexer 80). Registers 82, 84 are clocked by clock signal PCLK. The outputs of pass gates 81, 83, 85 are tied together at line SELIN_P, which is applied to the D input of register 90. Register 90 is clocked by clock BCLK, and drives line $NMTP_i\_BCLK$ to bus BBUS at its Q output; as such, register 90 is a register for storing the state of the signal to be presented on bus BBUS in the fashion discussed hereinabove relative to FIG. 7. Each of pass gates 81, 83, 85, in multiplexer 80 is of complementary construction consisting of parallel p-channel and n-channel transistors, controlled by a control signal (generated in complementary fashion by a corresponding inverter 87 as shown in FIG. 10).

According to this construction, multiplexer 80 selects from among line $NMTP_i\_PCLK$ and the outputs of registers 82, 84 for application to the D input of register 90. Control of the selection of these various functions is performed by arbiter 86, which receives lines REGION, RATIO and LINEUP at its inputs, and which decodes these signals into four control mutually exclusive signals D0, D1, D2 which, in turn, control pass gates 81, 83, 85, respectively.

Clock domain translation circuit 65 is thus able to translate the input signal $NMTP_i\_PCLK$ from the PCLK domain to output line $NMTP_i\_BCLK$, in the BCLK domain, in several ways, depending upon the phase relationship of the two clock signals PCLK, BCLK. Control signal D0, when selected, applies line $NMTP_i\_PCLK$ to the D input of register 90, such that its state will be presented upon line $NMTP_i\_BCLK$ upon being clocked in by a rising edge of clock signal BCLK. Control signal D1 presents the signal on line $NMTP_i\_PCLK$ to the D input of register 90 only after the occurrence of an intervening rising edge of clock signal PCLK that has latched the state of $NMTP_i\_PCLK$ into register 82. Control signal D2 applies the output of register 84, which is the state of line $NMTP_i\_PCLK$ after two intervening rising edges of clock signal PCLK (i.e., operating upon registers 82, 84 in turn), to the D input of register 90. As such, clock domain translation circuit 65 is operable to selectively apply the state of line $NMTP_i\_PCLK$ to line $NMTP_i\_BCLK$ upon the next rising edge of clock signal BCLK after zero, one or two intervening rising edges of clock signal PCLK. To effect this operation, arbiter 86 includes the appropriate decode circuitry to decode the phase region indicator on lines REGION for the current clock ratio signal on lines RATIO, along with the signal on line LINEUP, to assert the appropriate one of the control signals D0, D1, D2 to effect the proper transfer of the signal in the manner shown in the foregoing table.

Figure 11:
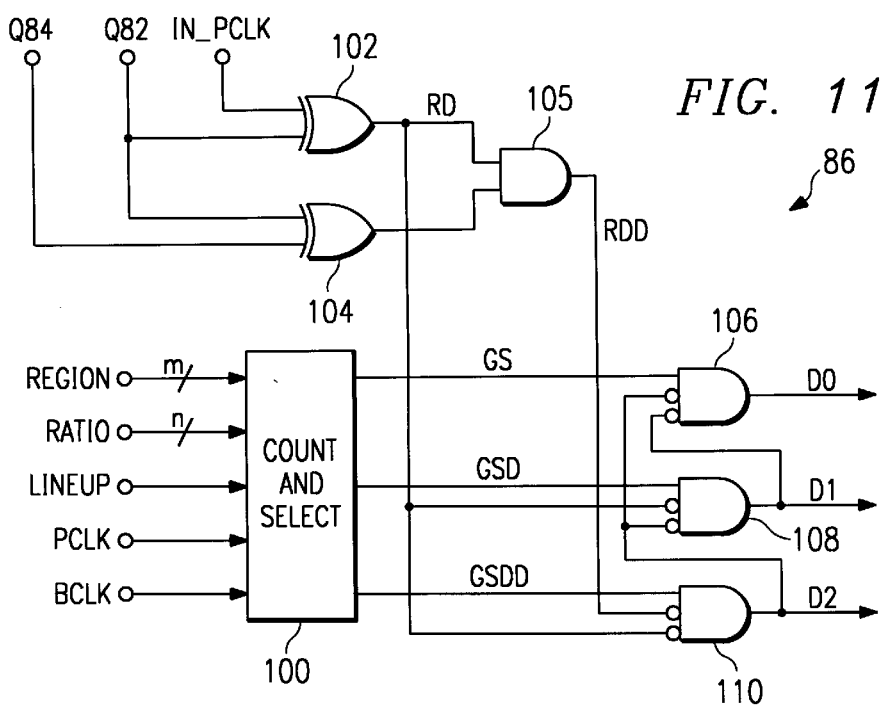
FIG. 11 is an electrical diagram, in schematic form, of the arbiter in the translation circuit of FIG. 10.

Referring now to FIG. 11, the construction of arbiter 86 according to this preferred embodiment of the invention will now be described in detail. Arbiter 86 includes counter and select circuit 100, which receives the phase region indicator signals on lines REGION, along with the current clock ratio signal on lines RATIO and the signal on line LINEUP; counter and select circuit 100 further receives the clock signals on lines PCLK, BCLK. Counter and select circuit 100, in response to these signals, asserts a selected one of its select outputs GS, GSD, GSDD, from which the multiplexer control signals D0, D1, D2 are derived; select outputs GS, GSD, GSDD respectively indicate, when asserted, whether the signal on line $NMTP_i\_PCLK$, the output of register 82, or the output of register 84, is to be applied to the data input of register 90, for a particular translation operation. The lineup signal LINEUP may be used by counter and select circuit 100 both in generating the proper multiplexer control signal, and also to ensure proper operation of the counter therein. Counter and select circuit 100 maintains the appropriate select output GS, GSD, GSDD for the duration of the transfer (i.e., over subsequent rising edges of clock signal PCLK), until clock signal BCLK makes a transition, at which time the signal translation will have been completed.

Arbiter 86 also includes logic for ensuring that the timing of the appropriate select signal D0, D1, D2 is controlled to be consistent with the receipt of the input signal. To this end, exclusive-OR gate 102 receives input line $NMTP_i\_PCLK$ at one input and the output of register 82 (line Q82) at its other input, and drives line RD at its output. Line RD is be driven high whenever the input signal on line $NMTP_i\_PCLK$ differs from the state of register 82, which occurs in the first cycle of PCLK after a logic transition on line $NMTP_i\_PCLK$ (i.e., before the new level on line $NMTP_i\_PCLK$ is latched into register 82). Similarly, exclusive-OR gate 104 receives the output of register 82 on line Q82 at one input, receives the output of register 84 at its other input, and drives one input of AND gate 105 with its output; the other input of AND gate 105 receives line RD from exclusive-OR gate 102. The output of AND gate 105, on line RDD, is thus driven to a high logic level whenever both the output of register 82 differs from the state of input line NMTP_PCLK and the output of register 84 differs from the output of register 82; this condition occurs if a logic transition occurs on line $NMTP_i\_PCLK$ in the first cycle after a previous transition has been latched into register 82 (but not yet latched into register 84).

Arbiter 86 includes AND gate 106 having an input connected to line GS and inverting inputs receiving multiplexer control signals D1, D2. AND gate 106 thus drives multiplexer control signal D0 at its output responsive to receiving an asserted signal on line GS from count and select circuit 100 in combination with neither of lines D1, D2 being asserted; this logical operation ensures that pass gate 81 is not turned on while one of the other pass gates 83, 85 is also on. AND gate 108 receives line GSD at one input, and receives line RD and line D2 at inverting inputs, and thus asserts multiplexer control signal D1 high to select pass gate 83 upon receiving the asserted signal on line GSD from counter and select circuit 100 in combination with neither of lines RD or D2 being high. Pass gate 83 will therefore not be turned on while pass gate 81 is on, nor will it be turned on if a new transition has been received at input line $NMTP_i\_PCLK$ that has not yet been latched into register 82. Finally, arbiter 86 includes AND gate 110 that drives line D2 at its output responsive to line GSDD received at one of its inputs, along with its inverting inputs that receive line RDD and line RD. Accordingly, AND gate 110 asserts multiplexer control signal D2 to select pass gate 85 responsive to counter and select circuit 100 asserting the GSDD line in combination with neither of lines RD or RDD being asserted, preventing pass gate 85 from being turned on if register 84 has not yet latched in a transition at line NMTP_PCLK (line RD high) or that has been latched into register 84 (line RDD high). Arbiter 86 thus ensures proper control of multiplexer 80 for the particular transfer operation.

Referring back to FIG. 5, the signal on line $NMTP_i\_BCLK$ is presented to the D input of register output $69i$. Clock signal BCLK is gated by AND gate $64_i$ with a signal GO_WO_i for write buffer $30_i$, so that register output $69_i$ is clocked in a mutually exclusive manner relative to the other write buffers 30. Signal GO_WO_i may be generated by an arbitration circuit (not shown), according to a predetermined priority scheme among write buffers 30. In the example of FIG. 5, register output $69_i$ is merely a D-type latch, in which the state of $NMTP_i\_BCLK$ is clocked in by a rising edge of the logical AND of clock signal BCLK and signal GO_WO_i, and is then presented at the output on line W_O_i_BCLK. Register output $69_i$ also has a reset input for receiving a reset signal on line LAST_TRANS, which is presented on bus BBUS by the recipient subsystem of the write operation upon completion of the operation; this signal will cause the completion of the write request signal upon completion of the main memory access.

Register output $69_i$ generates, at its output, a signal on line W_O_i_BCLK that is applied as a multiplexer control signal to write-out multiplexer 59 to select the output of write buffer $30_i$ for application to external bus BBUS. The bus of multiplexer control signals W_O_BCLK (see FIG. 2) generated by synchronizing timing control circuitry 62, one associated with each write buffer 30, are mutually exclusive of one another to control multiplexer 59 so that only the write buffer $30_i$ associated with the asserted one of multiplexer control signals W_O_i_BCLK is enabled to place data upon external bus BBUS.

Figure 12:
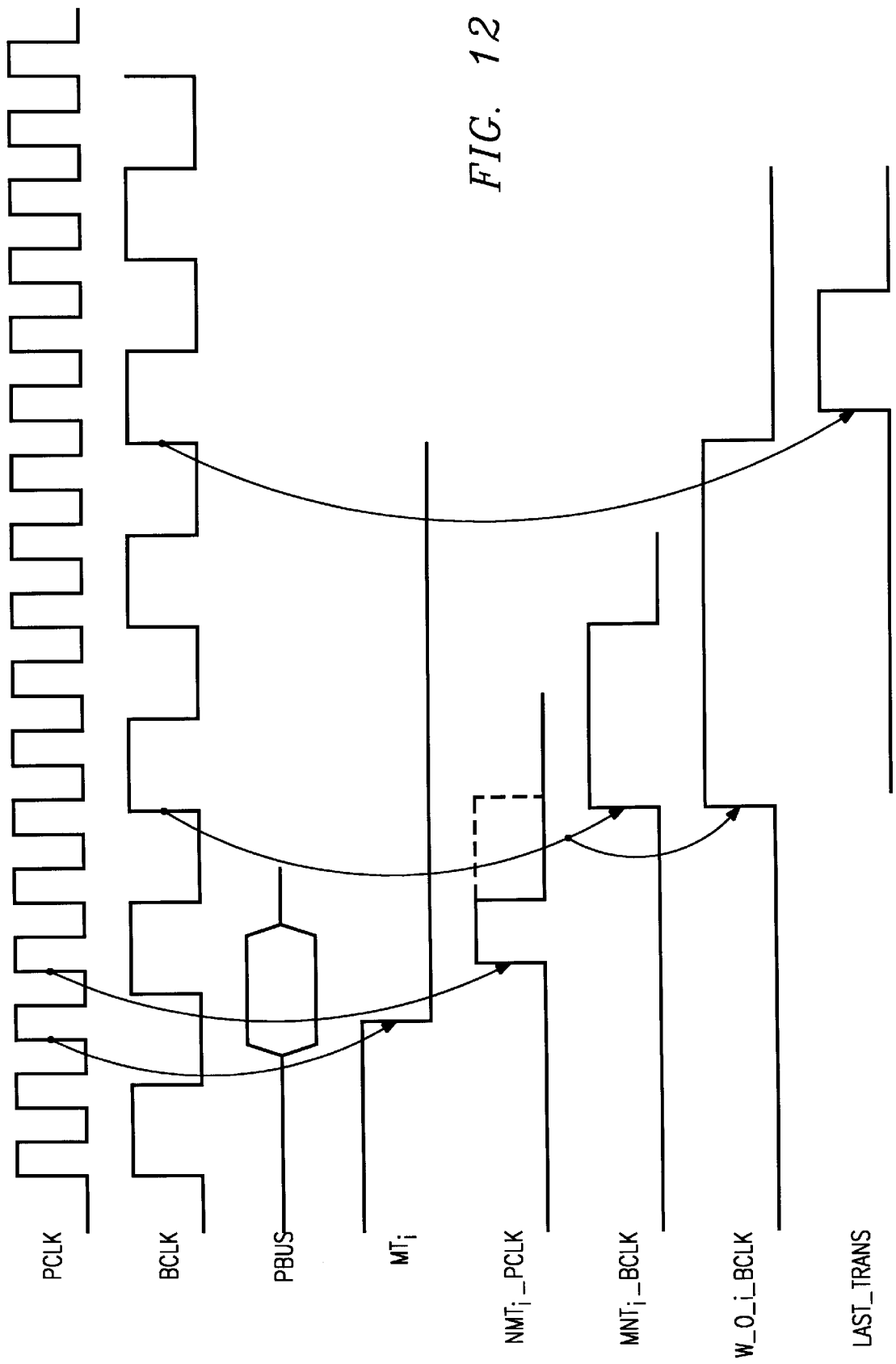
FIG. 12 is a timing diagram illustrating the operation of the timing control circuitry of FIG. 5, according to the preferred embodiment of the invention.

Referring now to FIG. 12, in combination with FIG. 5, the operation of timing control circuitry 62 in controlling the translation of data from bus PBUS through write buffer 30 and onto bus BBUS will now be described in detail. FIG. 12 illustrates the example in which a 16/6 clock ratio is present between clock signals PCLK, BCLK (i.e., sixteen PCLK cycles are contained within every six BCLK cycles). The writing of data from bus PBUS into write buffer 30 is effected by the valid data state on line PBUS of FIG. 12. Responsive to the writing of data into write buffer, effected by a rising edge of clock signal PBUS, control state machine 50 changes from the empty, idle state $61_0$ to state $61_1$ when at least one data entry is written into write buffer 30. At this time, lines STATUS make a transition from the empty state 00 to a non-empty state (e.g., 01). The operation of the NOR gate 63 then drives line MT to a low logic level, as shown in FIG. 12.

Upon the high-to-low transition of line MT, negative edge detector 67 serves to generate a positive pulse on line NMTP_PCLK, which is in the PCLK clock domain. This pulse occurs upon a rising edge of clock signal PCLK, and continues for one pulse of clock signal PCLK, as shown in FIG. 12. The pulse on line NMTP_PCLK is presented to clock domain translation circuit 65, which holds this state until the next rising edge of clock signal BCLK. In the example of FIG. 12, two intervening rising edges of clock signal PCLK occur prior to the next rising edge of clock signal BCLK, and as such the state of line NMT_PCLK is held within clock domain translation circuit 65 for these additional clock edges (as evidenced by the dashed lines in FIG. 12 on line WMTP_PCLK). Upon the next rising edge of clock signal BCLK, clock domain translation circuit 65 produces a pulse on line WMTP_BCLK, which remains for a full cycle of clock signal BCLK.

Line NMT_BCLK is presented to register output 69 which, in turn, presents a pulse on line W_O_i_BCLK (which is in the BCLK clock domain). As noted above, this signal controls write-out multiplexer 59 to select a write to main memory 21 from corresponding write buffer $30_i$ and to inhibit action by others of multiple write buffers 30. This pulse on line W_O_i_BCLK is maintained by control state machine 50 until it receives a pulse on line LAST_TRANS. Line LAST_TRANS is a control signal on line BBUS (as shown in FIG. 3), which is presented by main memory 21 and which indicates completion of the write transaction; in effect, line LAST_TRANS corresponds to the receipt (by main memory 21 or the destination subsystem) of the last write from write buffer 30 via bus BBUS. The rising edge of line LAST_TRANS resets register output $69_i$, such that line W_O_i_BCLK is driven low and thus deasserted. At this point, referring back to FIG. 4, write buffer control circuit will pass to the next most empty state, and decrement the value presented on lines STATUS thereby.

As is known in the art, on-chip cache memory is utilized to reduce memory access times performed by microprocessor 5, particularly in the case of memory addresses that are highly likely to be accessed given typical program flow. Caches thus serve to reduce the frequency with which slower main memory 21 must be accessed. According to the preferred embodiment of the invention, BIU 8 provides the capability of accessing write buffers 30 in the event of a cache miss or a "snoop" operation, and retrieving data therefrom if still resident therein, thus reducing the instances for which main memory 21 must be accessed. Referring back to FIG. 2 in combination with FIG. 3, another aspect of the present invention will now be described in detail.

As illustrated in FIG. 2, BIU 8 includes internal snoop control circuitry 71, which receives address and control signals from bus PBUS, responsive to which it can initiate an internal snoop of write buffers 30. Each of write buffers 30 have data outputs presented to the inputs of internal snoop multiplexer 73, which is under the control of internal snoop control 71. Internal snoop control 71 also presents signals to control state machine 50 of each of write buffers 30 to initiate an internal snoop operation, as will now be described.

In operation, referring to FIGS. 2 and 3 in combination, internal snoop control 71 receives address signals from the core of microprocessor on bus PBUS. For particular cycles, including memory reads initiated by load/store units 40 or externally generated "snoops", and that are cache misses relative to the on-chip cache memories 6, 16, internal snoop control 71 will assert line CHECK_TAG to control state machines 50 in each of write buffers 30 in combination with the higher order portion of the memory address from bus PBUS. Responsive to the asserted signal on line CHECK_TAG, each write buffer 30 will cause its tag compare unit 55 to compare the value of the address from bus PBUS to the contents of its tag portion 52 (either as actually stored or as calculable therefrom) to determine if the desired address matches the address of any of the data entries therein which, of course, would indicate that the desired data is resident in write buffer 30. This comparison operation will typically compare the higher order bits of the address from bus PBUS to the tag value or values stored in tag portion 52. If a match is found by one of write buffers 30, its control state machine 50 will assert the MATCH signal, which is forwarded to internal snoop control 71, indicating that the desired data is validly stored in that one of write buffers 30.

In response to receipt of at least one MATCH signal from write buffers 30, internal snoop control 71 will determine, according to an arbitration scheme, which of the write buffers 30 to address to access the data entry stored therein. Internal snoop control 71 will then assert a signal on line BUFF_SEQ to the selected one of write buffers 30 causing a read access thereto; control state machine 50 will then effect a memory read operation from its data portion 53 corresponding to the entry matching the desired address, such that the data is presented to internal snoop multiplexer 73. According to the preferred embodiment of the invention, the particular address requested in the snoop may require calculation of the specific address, using the starting address stored in tag portion 52 and then calculating the specific address by counting entries, following the burst sequence used in writing the data to the write buffer 30. Internal snoop control 71 will present the appropriate control signal to internal snoop multiplexer 73 to select the output of the selected write buffer 30 for application to bus PBUS for receipt by the core of microprocessor 5.

According to this embodiment of the invention, therefore, data that is written to one of write buffers 30 may be retrieved to effect either a memory access or a snoop operation. The access time required to access write buffers 30 will be much shorter than that required to access main memory 21, particularly considering that on-chip write buffers 30 preclude the need to obtain control of bus BBUS, and may be implemented as fast static memory cells.

The present invention thus provides numerous advantages in the design and performance of modern microprocessors, especially in providing efficient design of the write buffers therein. Synchronization of data transmission through the write buffers is made efficient by using the control path, rather than the data path, to effect synchronization in such a way that delays are kept to a minimum. Further, the present invention enables read accesses of the contents of the write buffers in the event of cache misses or snoop operations.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A microprocessor, comprising:
   data processing circuitry for executing instructions performed upon digital signals, and for communicating the results of such executing upon an internal bus synchronous with a internal clock; and
   a plurality of write buffers coupled to the internal bus, for communicating digital data corresponding to said results to a single external bus, said plurality of write buffers provided in a number and in respective sizes fixed upon manufacture, each of said write buffers comprising:
      a data portion for storing at least one digital data word received from the internal bus;
      a tag portion for storing a portion of a memory address associated with a digital data word stored in the data portion; and
      a control portion, coupled to the external bus and to the internal bus, for generating a status code corresponding to the capacity of the data portion that is available to receive digital data;
   wherein a first one of the plurality of write buffers has a first size; and
   wherein a second one of the plurality of write buffers has a second size different from the first size.

2. A microprocessor, comprising:
   data processing circuitry for executing instructions performed upon digital signals, and for communicating the results of such executing upon an internal bus synchronous with a internal clock;
   a plurality of write buffers coupled to the internal bus, for communicating digital data corresponding to said results to an external bus, each of said write buffers comprising:
      a data portion for storing at least one digital data word received from the internal bus;
      a tag portion for storing a portion of a memory address associated with a digital data word stored in the data portion; and
      a control portion, coupled to the external bus and to the internal bus, for generating a status code corresponding to the capacity of the data portion that is available to receive digital data;
      wherein the control portion of each of the write buffers comprises sequential logic operable in a selected one of a plurality of states, each of said plurality of states corresponding to a fullness or emptiness of said data portion, a first state being an empty state and a last state being a full state;
   wherein the control portion advances from said selected state into a next full state responsive to its write buffer storing a digital data word;
   wherein the control portion advances from said selected state into a next empty state responsive to the write buffer completing a write of digital data to the external bus;
   wherein said control portion generates said status code corresponding to said selected state; and
   wherein the external bus is synchronous with a bus clock having a frequency lower than the frequency of the internal clock; and
   write-out timing control circuitry, having inputs for receiving the internal clock and the bus clock, for generating a write-out enable signal to enable a selected one of the plurality of write buffers to present data to the external bus, the write-out enable signal being synchronous with the bus clock.

3. The microprocessor of claim 2, further comprising:
   a write-out multiplexer, having inputs coupled to data outputs of each of the plurality of write buffers, having an output coupled to the external bus, and having control inputs coupled to the write-out timing control circuitry to receive a write-out enable signal associated with each of the plurality of write buffers, the write-out multiplexer for selecting the data outputs of one of the plurality of write buffers responsive to the write-out enable signals presented to its control inputs.

4. The microprocessor of claim 2, wherein the write-out timing control circuitry comprises:
   clock domain translation circuitry associated with each of the plurality of write buffers, comprising:
      a phase determining circuit, having inputs receiving the internal and bus clocks, for generating a phase region signal corresponding to the phase relationship of the internal clock to the bus clock;
      a storage circuit, coupled to the sequential logic for its associated one of the plurality of write buffers and coupled to receive the internal clock, for storing a signal corresponding to the state of the sequential logic for at least one cycle of the internal clock;

a clock domain translation output register, having a data input, having an output, and having a clock input coupled to receive the bus clock;

a multiplexer, for selectably coupling, to the data input of the clock domain translation output register, the signal corresponding to the state of the sequential logic or an output of the storage circuit, responsive to a control signal; and an arbiter circuit, coupled to the phase determining circuit and to the multiplexer, for generating the control signal to the multiplexer responsive to the phase region signal; and a timing control output register, having a data input coupled to the output of the clock domain translation output register, and having a clock input coupled to receive the bus clock, for generating the write-out enable signal at its output.

5. The microprocessor of claim 4, further comprising:

a write-out multiplexer, having inputs coupled to data outputs of each of the plurality of write buffers, having an output coupled to the external bus, and having control inputs coupled to the write-out timing control circuitry to receive a write-out enable signal associated with each of the plurality of write buffers, the write-out multiplexer for selecting the data outputs of one of the plurality of write buffers responsive to the write-out enable signals presented to its control inputs.

6. The microprocessor of claim 2, wherein said plurality of states includes at least one state having a fullness or emptiness intermediate between the empty state and the full state.

7. A microprocessor, comprising:

data processing circuitry for executing instructions performed upon digital signals, and for communicating the results of such executing upon an internal bus synchronous with a internal clock;

a plurality of write buffers coupled to the internal bus, for communicating digital data corresponding to said results to an external bus synchronous with a bus clock at a frequency slower than the frequency of the internal clock, each of said write buffers comprising:

a data portion for storing at least one digital data word received from the internal bus;

a tag portion for storing a portion of a memory address associated with a digital data word stored in the data portion; and a control portion, coupled to the external bus and to the internal bus, comprising sequential logic operable in a plurality of states indicating the remaining capacity of the write buffer;

write-out timing control circuitry, having inputs for receiving the internal clock and the bus clock, for generating a write-out enable signal to enable a selected one of the plurality of write buffers to present data to the external bus, the write-out enable signal being synchronous with the bus clock; and a write-out multiplexer, having inputs coupled to data outputs of each of the plurality of write buffers, having an output coupled to the external bus, and having control inputs coupled to the write-out timing control circuitry to receive a write-out enable signal associated with each of the plurality of write buffers, the write-out multiplexer for selecting the data outputs of one of the plurality of write buffers responsive to the write-out enable signals presented to its control inputs.

8. A microprocessor, comprising:

data processing circuitry for executing instructions performed upon digital signals, and for communicating the results of such executing upon an internal bus synchronous with a internal clock;

a plurality of write buffers coupled to the internal bus, for communicating digital data corresponding to said results to an external bus synchronous with a bus clock at a frequency slower than the frequency of the internal clock, each of said write buffers comprising:

a data portion for storing at least one digital data word received from the internal bus;

a tag portion for storing a portion of a memory address associated with a digital data word stored in the data portion; and a control portion, coupled to the external bus and to the internal bus, comprising sequential logic operable in a plurality of states indicating the remaining capacity of the write buffer; and write-out timing control circuitry, having inputs for receiving the internal clock and the bus clock, for generating a write-out enable signal to enable a selected one of the plurality of write buffers to present data to the external bus, the write-out enable signal being synchronous with the bus clock, wherein the write-out timing control circuitry comprises:

clock domain translation circuitry associated with each of the plurality of write buffers, comprising:

a phase determining circuit, having inputs receiving the internal clock and bus clocks, for generating a phase region signal corresponding to the phase relationship of the internal clock to the bus clock;

a storage circuit, coupled to the sequential logic for its associated one of the plurality of write buffers and coupled to receive the internal clock, for storing a signal corresponding to the state of the sequential logic for at least one cycle of the internal clock;

a clock domain translation output register, having a data input, having an output, and having a clock input coupled to receive the bus clock;

a multiplexer, for selectably coupling, to the data input of the clock domain translation output register, the signal corresponding to the state of the sequential logic or an output of the storage circuit, responsive to a control signal; and an arbiter circuit, coupled to the phase determining circuit and to the multiplexer, for generating the control signal to the multiplexer responsive to the phase region signal; and a timing control output register, having a data input coupled to the output of the clock domain translation output register, and having a clock input coupled to receive the bus clock, for generating the write-out enable signal at its output.

9. The microprocessor of claim 8, further comprising:

a write-out multiplexer, having inputs coupled to data outputs of each of the plurality of write buffers, having an output coupled to the external bus, and having control inputs coupled to the write-out timing control circuitry to receive a write-out enable signal associated with each of the plurality of write buffers, the write-out multiplexer for selecting the data outputs of one of the plurality of write buffers responsive to the write-out enable signals presented to its control inputs.

10. A method of operating a microprocessor to communicate data from an internal bus in the microprocessor to an external bus, comprising:

presenting a write request signal to a selected one of a plurality of write buffers in combination with the data;

responsive to the write request signal, advancing a digital status code in a first direction, the digital status code indicating the remaining portion of the capacity of the selected write buffer available for receipt of additional data;

then operating the selected write buffer to couple a portion of its contents to the external bus for receipt by a subsystem coupled thereto; and responsive to receiving an end of transaction signal from the external bus, advancing the digital status code in a second direction opposite from the first direction;

wherein each of the plurality of write buffers includes sequential logic for determining the remaining portion of the capacity of its write buffer, the sequential logic having a selected one of a sequence of a plurality of states including an empty state, a full state, and at least one partially full state therebetween;

wherein the step of advancing a digital status code in a first direction comprises advancing the sequential logic from said selected state to a next state in the sequence toward the full state;

wherein the step of advancing the digital status code in a second direction comprises advancing the sequential logic from said selected state to a next state in the sequence toward the empty state;

wherein the internal bus is synchronous with a internal clock and the external bus is synchronous with a bus clock having a frequency lower than the frequency of the internal clock; and wherein the step of operating the selected write buffer to couple a portion of its contents to the external bus comprises:

storing, for at least one cycle of the internal clock, a non-empty signal corresponding to the state of the sequential logic advancing from the empty state upon receipt of data from the internal bus, the non-empty signal being synchronous with the internal clock;

generating a phase region signal corresponding to the phase relationship of the internal clock to the bus clock upon receipt of the non-empty signal;

selectably coupling, to the data input of an output register, either the signal corresponding to the state of the sequential logic or an output of the storage circuit, responsive to the phase region signal; and generating a write-out enable signal from the output register by clocking the output register with a signal synchronous with the bus clock.

11. The method of claim 10, further comprising:

applying the write-out signal to a control input of a write-out multiplexer, the write-out multiplexer having inputs coupled to each of the plurality of write buffers, and having an output coupled to the external bus, the write-out signal causing the write-out multiplexer to select the output of the selected write buffer for application to the external bus.

12. A method of operating a microprocessor to communicate data from an internal bus in the microprocessor to a single external bus, comprising:

providing a plurality of write buffers having a number and respective sizes fixed upon manufacture;

presenting a write request signal to a selected one of the plurality of write buffers in combination with the data;

responsive to the write request signal, advancing a digital status code in a first direction, the digital status code indicating the remaining portion of the capacity of the selected write buffer available for receipt of additional data;

then operating the selected write buffer to couple a portion of its contents to the single external bus for receipt by a subsystem coupled thereto; and responsive to receiving an end of transaction signal from the external bus, advancing the digital status code in a second direction opposite from the first direction;

wherein the plurality of write buffers includes at least two differing sizes; and the write buffer selected for a write request signal is based upon an amount of data to be written relative to the digital code indicating the remaining portion of the capacity of the write buffer.

* * * * *